(12) United States Patent
Miller et al.

(10) Patent No.: US 9,171,179 B2
(45) Date of Patent: Oct. 27, 2015

(54) SYSTEM AND METHOD FOR THE PROVISION OF MULTIMEDIA MATERIALS

(71) Applicants: J. Michael Miller, Livermore, CA (US); Mark Deaver, Norman, OK (US)

(72) Inventors: J. Michael Miller, Livermore, CA (US); Mark Deaver, Norman, OK (US)

(*) Notice: Subject to any disclaimer, the term of this patent is extended or adjusted under 35 U.S.C. 154(b) by 100 days.

(21) Appl. No.: 13/684,510

(22) Filed: Nov. 24, 2012

(65) Prior Publication Data

US 2013/0159708 A1    Jun. 20, 2013

Related U.S. Application Data

(60) Provisional application No. 61/577,642, filed on Dec. 19, 2011.

(51) Int. Cl.
| | |
|---|---|
| *H04L 29/06* | (2006.01) |
| *G06F 21/62* | (2013.01) |
| *G06F 17/30* | (2006.01) |
| *G06F 21/10* | (2013.01) |
| *G06F 17/24* | (2006.01) |

(52) U.S. Cl.
CPC ............ *G06F 21/6218* (2013.01); *G06F 17/24* (2013.01); *G06F 17/3007* (2013.01); *G06F 21/10* (2013.01)

(58) Field of Classification Search
CPC ..... G06F 21/60; G06F 21/10; G06F 17/3007; G06F 17/24

USPC ................. 713/165, 167; 380/231, 233, 201; 707/821

See application file for complete search history.

(56) References Cited

U.S. PATENT DOCUMENTS

| | | | |
|---|---|---|---|
| 7,739,723 B2 * | 6/2010 | Rogers et al. ...................... 726/2 |
| 2003/0110503 A1 * | 6/2003 | Perkes ............................ 725/86 |
| 2007/0168413 A1 * | 7/2007 | Barletta et al. ................ 709/203 |
| 2011/0235799 A1 * | 9/2011 | Sovio et al. ..................... 380/30 |
| 2011/0238985 A1 * | 9/2011 | Sovio et al. ................... 713/168 |
| 2012/0311448 A1 * | 12/2012 | Achour et al. ................ 715/723 |
| 2013/0215116 A1 * | 8/2013 | Siddique et al. ............. 345/420 |
| 2014/0310729 A1 * | 10/2014 | Chaniotakis et al. ......... 719/328 |

* cited by examiner

*Primary Examiner* — Samson Lemma
(74) *Attorney, Agent, or Firm* — Handal & Morosky, LLC

(57) ABSTRACT

A method for enabling the storage, distribution, and use of associated text and media files comprises a webpage interface coupled to an information and support system, an account creation and login system, a user media storage system, a solicitation assistance and user matching system, a solicitation and collaboration agreement system, a media collaboration and project creation system, and a product gallery and sales system. Means are provided for a user to gain access to the inventive systems through an Internet connection on a local user computing device. In accordance with the invention, information is input into a database storage medium coupled to an operator system computing device which then combines the information into an augmented text-media file output. The inventive systems also distribute augmented text-media file output products to users of the inventive systems through a webpage interface system.

11 Claims, 33 Drawing Sheets

Account Creation and Login System

Methodology Overview

Information and Support System

Figure 3:
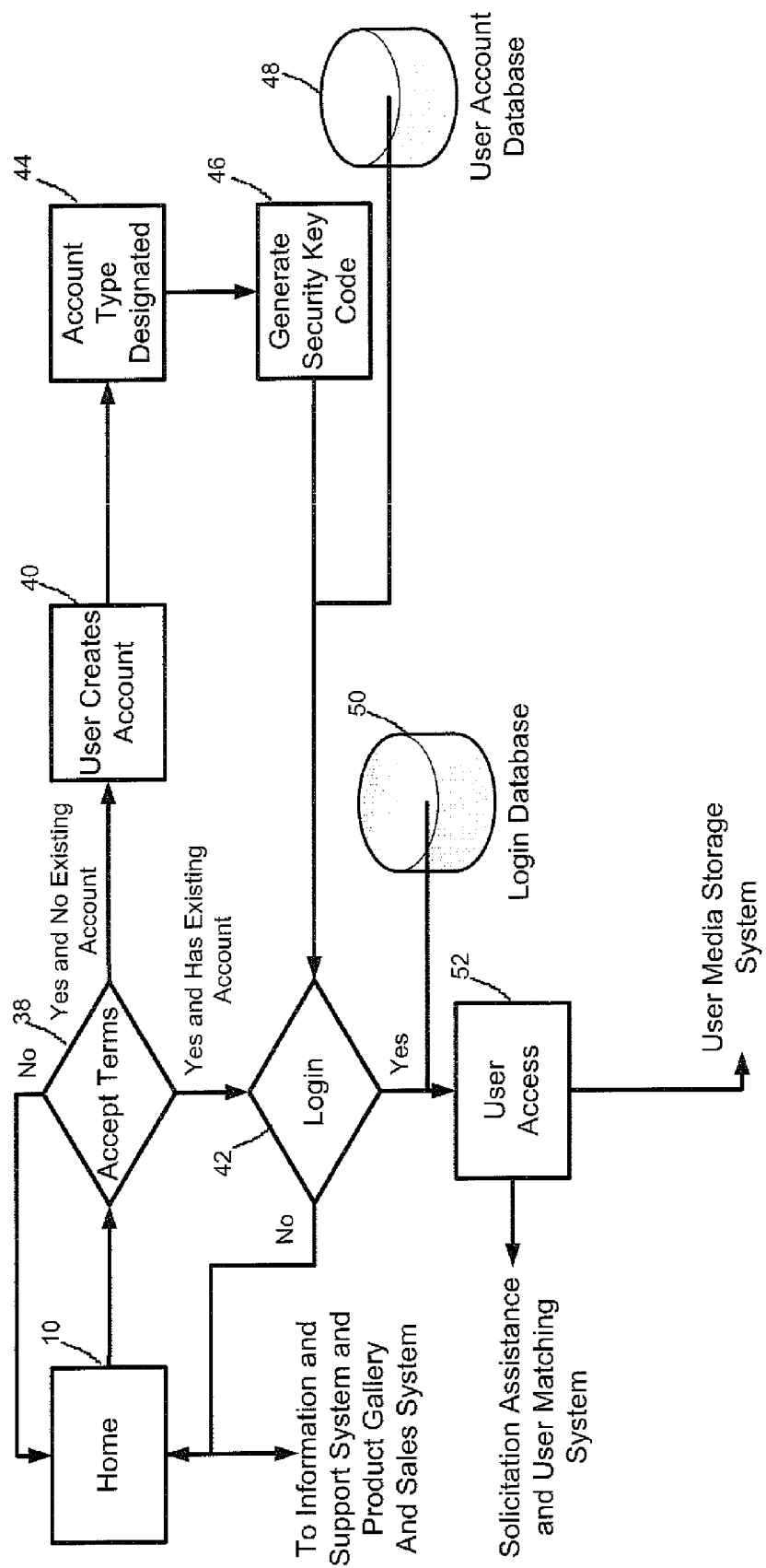

Fig. 3  Account Creation and Login System

Figure 4:
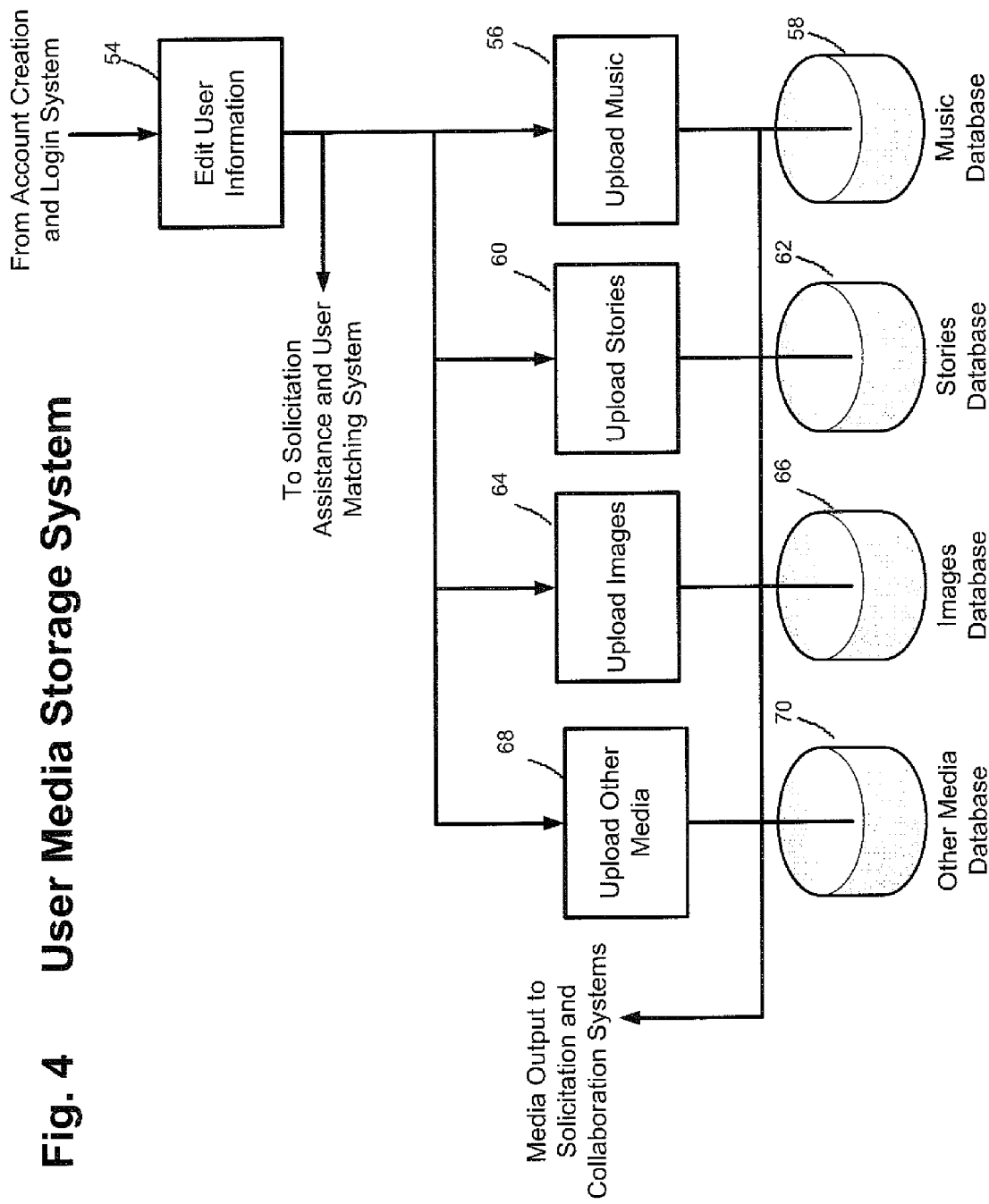

Fig. 4    User Media Storage System

Figure 5:
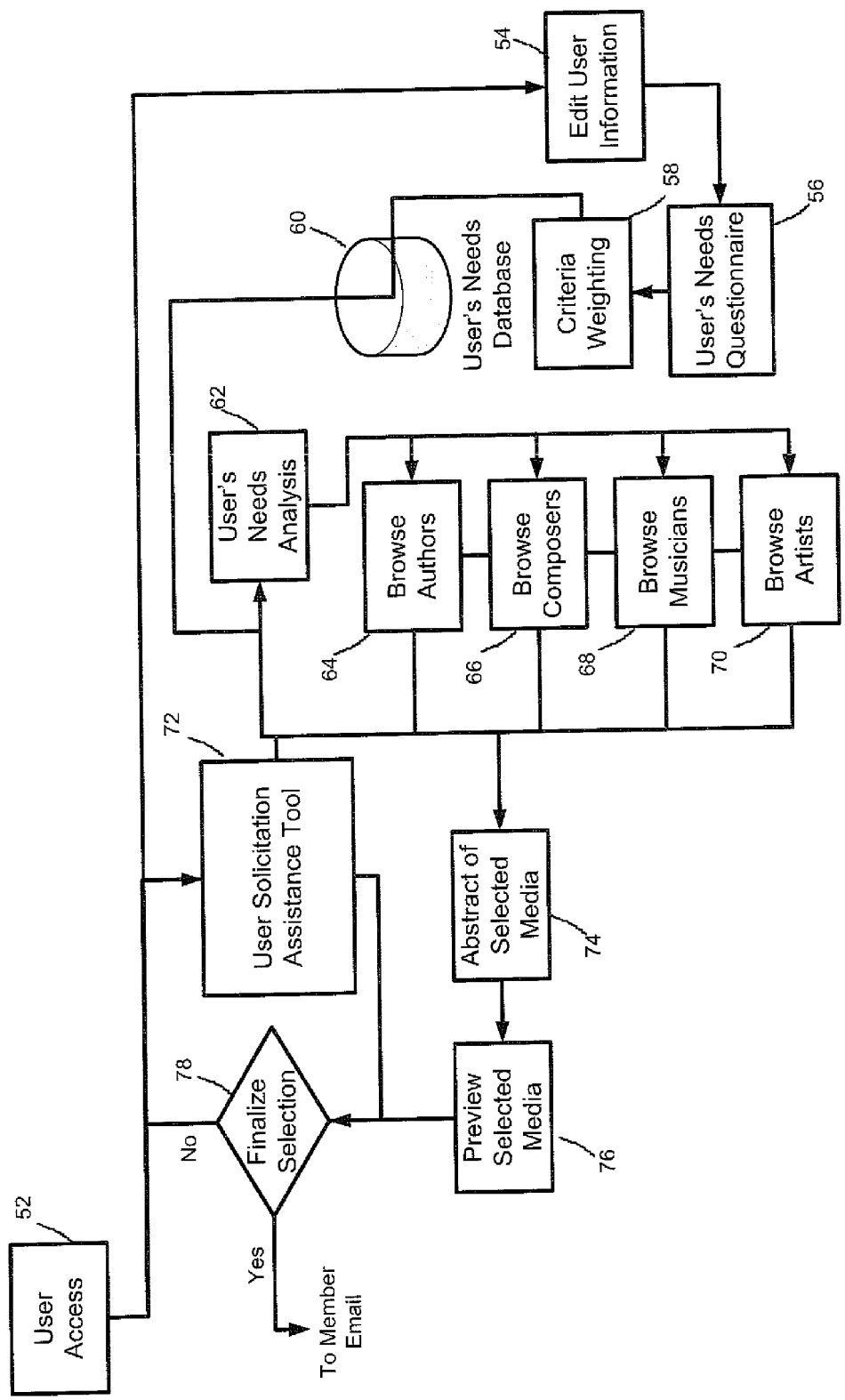

Fig. 5  Solicitation Assistance and User Matching System

Solicitation and
Collaboration Agreement System

Figure 7:
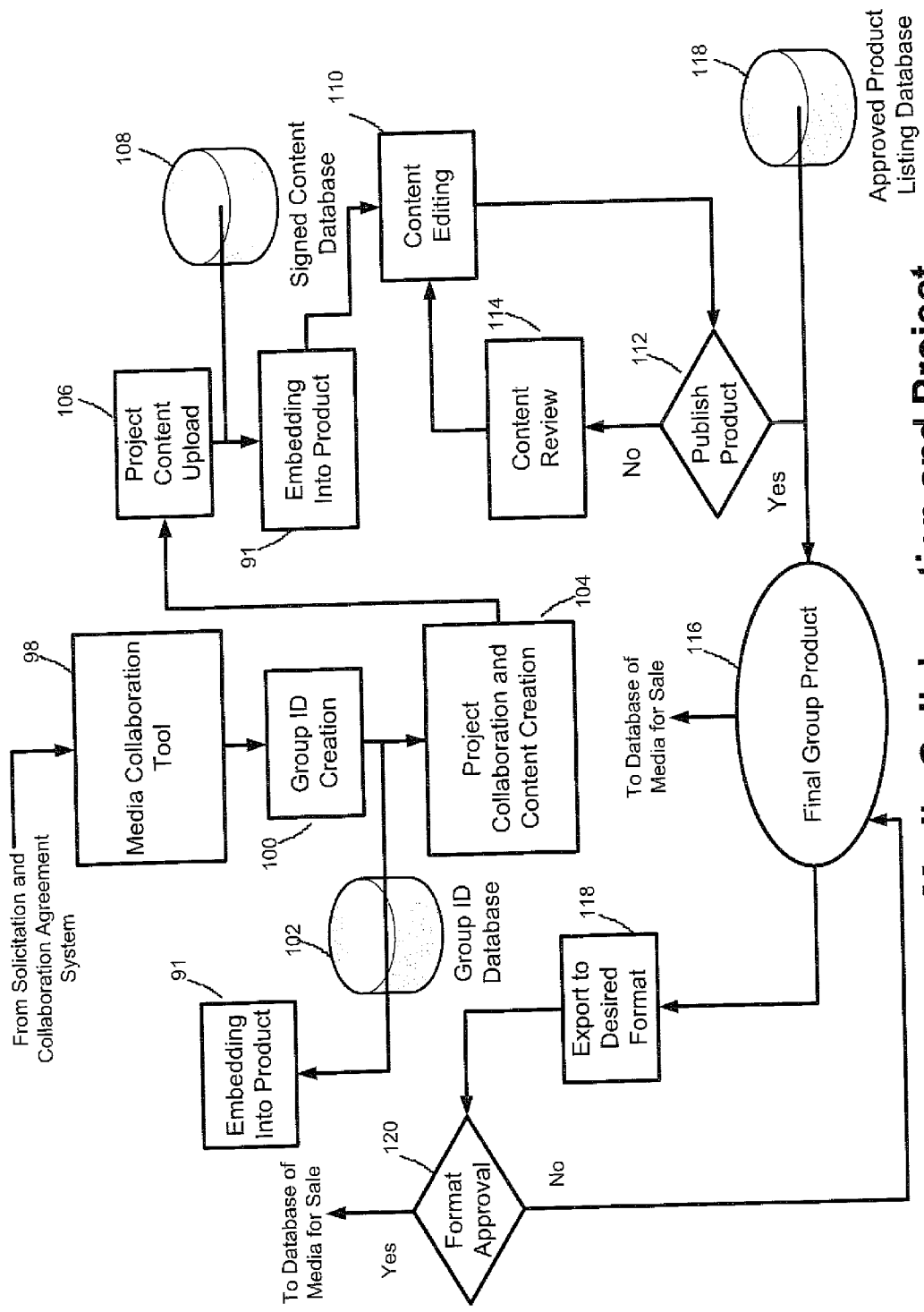

Fig. 7 Media Collaboration and Project Creation System

Product Gallery And Sales System

| Home | HOW TO | AUTHORS | SONGWRITER, COMPOSERS STUDIO MUSICIANS | ARTIST | FILMMAKERS |

| Supporting Content Creators | Existing Content Suppliers |
|---|---|
| Authors | Authors |
| Sonwriters/Studio Musicians, Vocalist ansd Composers For Hire | Singer/songwritters |
| Animators | Publishing Companies; record labels; indie artists |
| Artist/illutrators | Artist/illutrators |
| | Sound Effects library |
| Photographers | Photographers |
| Narrators | |

HOW TO...

Figure 10

| HOME | HOW TO | AUTHORS | SONGWRITERS, COMPOSERS AND STUDIO MUSICIANS | ARTISTS | FILMMAKERS |
|---|---|---|---|---|---|
| | | | | | |

| | Authors | Benefit | How To |
|---|---|---|---|
| Artist Home Page/Social Networking | Need | Create you home page MuZook and include exerts from you MuZook with links to the soundtrack supporting the exert or choose to have the score played over the various chapter. Provide links to your various Facebook, Twitter, Youtube, LinkedIn and more | Beging with creating you MuZook membership, then follow the easy instructions to creating you home page |
| Editing/ Copywriting / proofreading | Need | Multiple copyediting plans and editorial services | Upload your transcript, choose the plan best suited for you transcript |
| Photographs | Need | Stock Photography available in our library or Partner Companies | Search our portal database with keywords to find photos and partners for contract work specific to your needs |
| Marketing/ Publishing Distribution | Need | Choose from multiple marketing options such as Promo Trailer press Release, multiple marketing materials such as publicity kit, self sheets posters to fit your budget for sale posters to fit your budget for sale through MuZook and Tablets and eReaders | Choose online options for well defined marketing programs of work directly with our marketing agency to tailor a plan for your MuZook. |
| Design Illustrations | Need | Top name artists with experience with Disney , Pixar and industrial Light and Magic. Use the designers for book cover artwork to children books illustration and marketing materials | Our artist have displayed a portfolio of work seen both in our library and on the Artist's home page. Choose from the style of artwork that best suits your project. |
| Proofing | Need | You the writer will Proof the work you have contracted for in order to insure your complete satisfaction | Redline markups of your MuZook will be provided with comments and/or options explaining the suggested change for your reviewed and consent of comment |
| Digital Formating | Need | Partners with MuZook can provide App formatting for all forms of electronic publishing | Choose the App format you feel best suits your chosen marketing plan with help from out help from our staff |
| Merchandising | Need | Work without designers and production team to create multiple merchandising memorabilia from stuffed creatures, T-shirts , Poster and more. | Depending on the success of your MuZook a variety of merchandise options can be made available to benefit everyone involved in the creation of the MuZook |
| Video/ Promo Trailer | Need | Generate excitement for the release of your books as you join the new world of books with soundtrack and much more. Put yourself ahead of the authors by creating videos based on your bookand music videos with performing artists | Our partnering Film studio will produce, edit and finalize a finished promo trailer based on your budget and theatrical production. Songs from the MuZook can be featured over scenes from your MuZook |

Figure 11

| HOME | HOW TO | AUTHORS | SONGWRITERS, COMPOSERS AND STUDIO MUSICIANS | ARTISTS | FILMMAKERS |
|---|---|---|---|---|---|

| | Authors | Benefit | How To |
|---|---|---|---|
| Soundtrack | Need | Audio will anhance any reading experience. How many time have you heard someone say " the book was better than the movie, but I liked the music". No you can combined the best of both worlds. Create music that will forever be associated with memories or your MuZook. Search the MuZook Kettle library and choose from a inventory of music that compliments your transcript or request original music proposals from our partner companies and within the Kettle based on descriptions of scenes and genere provided by you. The music can be included with the price of your MuZook or left to be downloaded and purchases separately by the Muzook reader | Choose the genre and topic via keywords of your music. Our MuZook engine will allow you to capture the song and embed the material right into your MuZook. Work with our partner publishing companies and indie artists to create original music written and recorded especially for your book. Children's book authors embed music or allow the parent to embed their child's favorite music into their purchase of you MuZook |
| Animation | Need | Any author choosing to use Photoshop or other layered illustrations can have 2d animation styled when scrolled across or @ with the turn of the page. Children's Book authors. Graphic Novelists ans Comic BookWriters/Publishers txing your illustrations to life as the reader's bond with your characters grow with each illustration containing the sound effect. | Upload you compatible formatted work for the transcript and illustrations provided by the author or work with our artists and illustrators to create the preferred illustration. Work with our animators to create that special personality only animation can provide. |
| Sound Effects | Need | Embed sound effects from our library or upload yours to our library and embed your own sound effect | Browse the Kettle to create your illustrations for your transcript and embed the chosen sound effect from our library, or add your own sound effect to our growing library and embed your own. |
| Transcript | Need | Choose from the list of approved file types and upload your transcript and bring the words to file with MuZook. | Create your membership, choose the type of book you will be uploading, whether illustration will be required. If you want to chose from our library or contrsct with our various artist and publishers for original music for your MuZook. |
| MuZook Kettle | Need | A collective creative collaboration within the MuZook Kettle of talent from component of the art world as we know it. This collaboration will evolve as an amoeba changing shape with each evolution of MuZook. The options are endless for new creative MuZooks writers and contributors. | Memebrs only be able to login to the MuZook Kettle and submit works for consideration by authors who have requested submittals based on chapters they have displayed in the kettle. |

Figure 12

| HOME | HOW TO | AUTHORS | SONGWRITERS, COMPOSERS AND STUDIO MUSICIANS | ARTISTS | FILMMAKERS |
|---|---|---|---|---|---|

| | Songwriters Note (2) | Composers Note (2) | Indie Bands Studio Musicians | Benefit | How To |
|---|---|---|---|---|---|
| Photographs | Need | Need | Need | Use our Kettle library to create CD Labels for Importing into Muzooks or the individual sale of singles and CDs direct from MuZook | Work with author if Music is downloaded in to a Muzook choose from our inventory for contract for professional photography |
| Marketing | Mkt Drag | Mkt Drag | Mkt Drag | Embedded music will get the benefit of marketing as the music is part of the Muzook. Depending on Option, music can be downloaded from Muzook and sold MuZook as a single or as part of a soundtrack within the terms of a royalty agreement. | Provide links to your home page and review the request forum where authors will ask for submittals of various music will be listed |
| Publishing/ Distribution | Need | Need | Need | Use MuZook Music Sales to distribute your music for sale on the Muzook portal, with additional distribution through our partner companies and through the sale of the MuZook. | Create your original music and the mutual benefits of book publishing with the embedding song chosen, or list you song in our library both for use by the author and sale by MuZook music sales |
| Design/ Illustrators | Need | Need | Need | Use our artist to design promotional material for you webpage, CD, promotional materials | Review inventory in the Kettle provided by photographers, artists and Illustrators and music video specialists. Work through MuZook to create the promotional material best suited for your work Use material on your homepage with links to your social network |
| Sound Engineering Mixing Mastering | Need | Need | Need | Use or sound engineers to add effects and mix your music or format Pro Tools or other formats into acceptable format for embedding music into a MuZook Music effects to auto tuning. Our engineering learn will master the final product for release. | Upload acceptable formatted music or Pro Tools sessions. Select the level of sound engineering you require. We have engineers available throughout our network/ |
| MuZook Kettle | Need | Need | Need | A collective creative collaboration within the Muzook Kettle of talent from every component of the art world as we know it. This collaboration will evolve as an amoeba changing shape with each evolution of MuZook. The options are endless for new creative Muzooks. | Members only will be able to login to the Muzook Kettle and submit works for consideration by authors who have requested submittals based on chapters they have displayed in the Kettle. |

Figure 13

| HOME | HOW TO | AUTHORS | SONGWRITERS, COMPOSERS AND STUDIO MUSICIANS | ARTISTS | FILMMAKERS |
|---|---|---|---|---|---|

| | | | | | |
|---|---|---|---|---|---|
| Producing | Optional | Optional | Optional | Use or Successful Music Producers from Nashville to CA to add the extra elements to your music providing that sound fitting of the MuZook chapter Studio Musicians can be used to finish production of submitted work. | Review our various levels of Production assistance and work with our team to finalize you finished work |
| Recording Studio | Need | Optional | Need | Touring Musicians can use studios on the radio record tracks or use pur partner companies for recording | Choose from a network of Studio will transfer the session to our main studio for completion |
| Proofing | Need | Need | Need | Work for hire or other music provided by songwriter or indie perfomers will need to be coordinated with the author for inclusion into the MuZook. | Work will be submitted by job number given the artists and correspondence with the author or other professionals creating the final product will occur through the MuZook Network |
| Digital Formatting | Need | Need | Need | Sessions will be mixed, and masters then formatted for sales in various formats chosen by the artist and MuZook Libraries. | Upload masteres songs in an acceptable formats offered by MuZook and additional formatting will be offered to the artists if needed for the use in MuZooks or sales through partner companies. |
| Merchandise | Need | Optional | Need | MuZook's team of artist can assist in the preparation of work ranging from promotional artwork, poster, CD artwork, T-Shirts and more | Review the styles of artists from our library or the artists home page. Contact with our team though MuZook for preparation and distribution of merchandise |
| Promo Trailer Music Video | Optional | Optional | Optional | Videos of single to be released as promotion of the MuZook may be used by the author or the performing artists. The content of the video will portray a joint production of the MuZookand performing artist. | The Author and/or performing artists will determine the content of the video, depending on the party requesting the video. Joint production of the song will occur through MuZook Production teams |
| Animation | Optional | NA | Optional | Performing artists can choose to animate portions of the Music Video using content contained within the MuZook or Promotional Trailer. | Performing artist can choose from options available for various levels of animation for inclusion of animation to in the Music Video |
| Sound Effects | Optional | Optional | Optional | Choose from a list of sound effects within our library or from out engineering and promotion tem augment your recording. | Upload your acceptable formatted songfile and choose from our various sounf effects options whether using our existing library or our team of engineering specialists. |
| Lyrics | Need | NA | Need | Lyric Sheets and musician credits must be provided with any song submitted to the MuZook library | Options for submittinglyrics and music credits will be found uploading music to the MuZook library |
| MuZook | Need | Need | Need | Write your own true life or fictional story behind the creation of a single or LP and them embed the single of LP in to the MuZook. Pricing for the sale of the MuZook Storyteller Short Should be significantly greater than that of a single. | Use the Author optios for the creation of your MuZook Storyteller Short. Follow the instructions for uploading and designing you short story or novel. Use the embedding tools provided to upload your songs consult with editing anf design programs for making your Muzook Storyteller the best it. |

Figure 14

| HOME | HOW TO | AUTHORS | SONGWRITERS, COMPOSERS AND STUDIO MUSICIANS | ARTISTS | FILMMAKERS |
|---|---|---|---|---|---|

| MuZook Kettle | Artists Note (1) | Illustrators Animators Note (1) | Benefit | How To |
|---|---|---|---|---|
| Photographers Illustrators Artists | Need | Need | Provide examples of your portfolio or upload your entire inventory, made available for purchase to the public or as part of our MuZook library for inclusion in a MuZook. Submit confidential proposals through the Kettler network contributin your ideas and arwork to the creation of future MuZooks | Once a member, upload your acceptable formatted portfolio or examples of you photographs, artwork, illustrations to the library of MuZook. Works canbe offered for sale to the general public through MuZook and or used by license agreement with a MuZook author. Photoshop layered images can be uploaded and used in the animation proposals to the author |
| Distribution | Optional | Optional | Use MuZook to offer your work for sale to the general public and through partner companies with MuZook. | Acceptable formats will be displayed in the MuZook library and the members home page. Member will establish pricing through license agreements with MuZook. Link your work to partner companies |
| Design | Provide | Provide | Review the Muzook Kettle to submit your ideas to authorswho have requested proposals or provided chapter(s) to read in anticioation of receiving creative idea to incorporate you work into the Muzook | Members only will be able to login to the MuZook Kettle and Submittals based on chapters ther have dsplayed in the Kettle. |
| Digital Formating | Need | Need | Upload you work in acceptable formats to MuZook; anyreormatting of the artwork to create the App will be done by Muzook | Upload your photographs, illustrations and artwork into the MuZook Library based on acceptable formats. Options will be available to sell your work through the Library, with the artist establishing the price. Portfolio from third party libraries may be linked based on licensing agreements with MuZook |
| Merchandise | Need | Need | Market your products on your MuZook webpage. Use options for posters, postcards varying photo sizes, T shirts and more. Links to you illustrations and artwork shown in the MuZook can be embedded into the Muzook | Purchasers of you work will options your uploaded materials on the MuZook library to order downloads based on pixel sizes, posters,postcards or gift cards displaying your work, T-shirts with your work displayed and many others options |
| Animation | Provide | Provide | 2d animators can display their reel onto their webpage and upload individual works for sale to the general public. Children's book authors, graphic novelists and comic book writers will be able to use 2d animation on their illustration with the acceptable illustration format. | Sign in to your account and upload you reel and more on your MuZook Kettle and provide work for hire animation to authors of all kinds illustrations to enhance their books. |

Figure 15

| HOME | HOW TO | AUTHORS | SONGWRITERS, COMPOSERS AND STUDIO MUSICIANS | ARTISTS | FILMMAKERS |
|---|---|---|---|---|---|

| MuZook Kettle | Filmakers | Benefit | How To |
|---|---|---|---|
| Editing, Sound Engineering, Mixing Sound Effects, Special Effects | Need | Choose from a list of partner companies or review submitted reels from editors in our library or MuZook Kettle for collaboration on your film project subject to terms of license agreement from our partner companies or the kettle | Become a member of the MuZook Kettle and have access to artists, engineers, film editors. Request proposals for your work based on your budget or choose from our packages. |
| Photographs | Need | Use still photography for DVD cover art or scene effects | Choose from the Kettle fibrary or request new work based on your definition of the scope and content of your work |
| Marketing | Need | Include your finished DVD in our MuZook Library and opt to sell ans rent your DVD. Present your film to partner company Production Companies and Film Studios. Use our Press Kit package for press releases and more. List your Video downloads to IMDb. | Upload you final product into the MuZook library and categoriz by genre. Choose from our marketing plans or seek to create your through the Kettle |
| Design | Need | Work with our artists through the Kettle to create unique designs for film artwork, DVD covers, posters and more | Choose from the Kettle's existing library. Choose one of our plans or seek proposals from the Kettle. |
| Recording Studio Soundtrack/Film Score | Optional | Search the Kettle for recording studios in your area for overdubbing use our partner companies for recording original soundtracks, film scores and more. Request work Though the Kettle for original song submittals based on your definition of content genre and more or choose from the Kettle's existing Library of songs. Requests proposals for firm scores through our Kettle based on your budget. Hear examples of previous work from the musician and / or composer. | Join the Kettle and have access to professional songwriters partner publishing companies, recording studios composers, studio musicians, vocalists and more. |
| Copywriting | Need | Use our team of copywriters for press release and other advertising and marketing material | Choose one of our press packages or uss the Kettle for seek roposals based on your budget. |
| Merchandising | Need | Use Partner Co s or the Kettle for designing creating and distributing merchandise approved by you for the marketing of your movie Request proposals for work defined within the Kettle | Choose one of our packages or request proposals from the kettle for various elements of merchandising for sale on MuZook |

Figure 16

| HOME | HOW TO | AUTHORS | SONGWRITERS, COMPOSERS AND STUDIO MUSICIANS | ARTISTS | FILMMAKERS |
|---|---|---|---|---|---|
| Promo Trailer | | | Need | Provide your own promo trailer or use the Kettle to request proposals for taking your film video to another level with our partner companies and/or Kettle Members | Choose one of our packages or upload you film into the Kettle and request for Proposals From our Kettler members. |
| Video | | | Provide | Upload your video and use our Kettle to help in the refinement, design, marketing and more and include your video in our library for sale and/or rental | Upload your completed video and choose various options for sale/rental, marketing, digital formatting and many other options on MuZook. Add the use in seeking additional work from Kettle Members |
| Digital Formatting | | | Need | Use our team for formatting your final product for sale in various digital formats and App creations for iPad and Android based tablets and IPhone and Android based smart phones | Upload an acceptable fromat to the Muzook Library or the Kettle. Select for a list of packages for the digital formatting and App Creation you desire or seek proposals from the Kettle Members |
| MuZook Kettle | Need | Need | Need | A collective creative collaboration with in the MuZook Kettle of talent from every component of the art world as we know it. This collaboration will evolve as amoeba changing shape with each evolution of MuZook. The options are endless for new creative MuZooks. | Members only wil be able to login to MuZook Kettle and submit works for considerations by authors who have requested submittals based on chapters they have displayed in the Kettle |

Figure 17

Online Database of Questions and Answers

Customer Support Information
-Free Assistance (Email Based)
-Fees for Calls

CUSTOMER SUPPORT

Figure 22

| Home | Catalogue | About | How to... | Shopping Cart | Checkout | Sign Up | Login |
| --- | --- | --- | --- | --- | --- | --- | --- |
| Customer Support | | Communities | Partners | Contact Us | | Z Kettle | |

Requests for FREE CONSULTATION on creating a MuZook
Request Form will include contact info but no obligation to sign up

MuZook Pioneer digital publishing for e-readers and tablets, and has worked with some of the leading agencies. We can help your clients profit in this exploding marketplace!

Get Started!
Fill out the form for a free consultation
* is a required field Company Name*
Company Website
Your Name*
Emails*

How many Vooks are you intrested in Publishing?
1-5

Please Describe the enhanced content you'll like to publish with Vook

Do you or your authors have video available? If so, in which in formats, and for how many titles?

Who owns the ebook or multimedia rights to your clients content?

( Request Information )

Vook aims to respond to your request for information within one business day. Due to demand from Publisher, please accept in advance our apologies should our response be delayed. Vook does not sell or rent your email address.

SIGN UP NOW!
Don't let this new art form
pass you by without your
contribution to its
evolution.

Z
K
E
T
T
L
E

Figure 23

| Home | Catalogue | About | How to... | Shopping Cart | Checkout | Sign Up |
|---|---|---|---|---|---|---|
| Customer Support | | Communities | Parners | Contact Us | | Login |

Cart | My Account | Help

Z Kettle

Publish | Services | Get Started | Preview Gallery | Showcase | Community | Resources | Enterprises

Z
K
E
T
T
L
E

Create a new MuZook Account or join Z Kettle

Email Address [_____]

Password [_____]

Re Enter [_____]

First Name [_____]

Last Name [_____]

Country [▼ _____]

Please Coose One

What type of media are you consedering publishing?

[▼ Please Coose One]

Send me Update and Promotions ☐ Privacy Policy

We won't sell you contact information

[ Create My Account ]

Sell your book, DVD, CD, MP3, or video download on Amazon.com and other marketplaces. Earn royalties on every sale that you make without having to worry about inventory, minimum orders or setup fees.

Step 1: Create your free acct for shopping and browsing

Start Here Sign Up

Step 2: Become a member of the MuZook Kettle to actively participate in this new art form as a contributing artist/write/musician/filmmaker...

Step 2

Note!!! Type of media menu should be extensive to allow applicant to choose defining the artist membership is author, musician, song writer, performer, artist, illustrator, 2d animator, composer studio musician, photographer, indie bands, filmmaker, videographer (ability to choose boxes for programs familiar with i.e. Photoshop, final cut pro, Vegas Pro. Etc songwriter classifications of music written i.e. country, rock, etc indie bands define style of music by keywords country, rock, folk rock hip hop, etc. Multiple keywords should be made available for artists to use Once registration is complete, the next step would be to allow the member to create their own homepage on MuZook with social links to their Facebook, Twitter, YouTube, imdb, Linkdin,etc.

Term of Use   Member Agreement   Privacy   Sitemap   Careers

Figure 25

[Home] [Catalogue] [About] [How to...] [Shopping Cart] [Checkout] [Sign Up] [Login]

[Customer Support] [Communities] [Partners] [Contact Us]

Z Kettle

*First Name
*Last Name
Professional Name         M.I.
*Social Security *
*Address 1
Address 2
*City
*Zip Code
*State                    Choose State Province ▼
*How Long at
Current Address?          2011 ▼    January ▼
Previous Address
*Home Phone
Work Phone
Cell Phone
*Email Address
*Confirm Email
Website Your Music
*Primary
Instrument(s)
Other Instrument(s)
Current Musical
Group (if Any)
Current Manager
(s)/ Booking Agent(s)

Include same subcategories for authors, artists, filmmakers, illustrators, photographers, animators

[Next]

Figure 32:
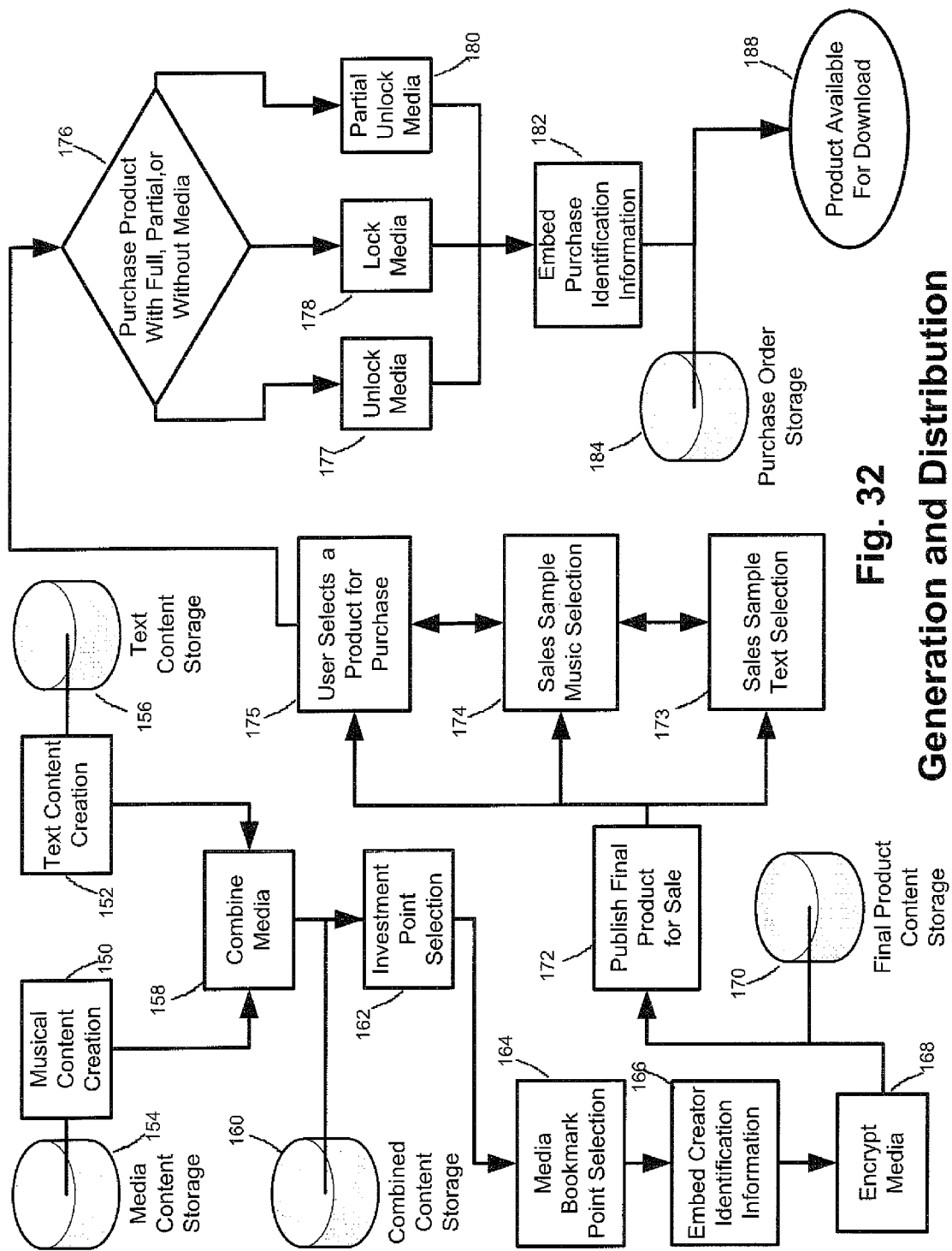

Fig. 32 Generation and Distribution

SYSTEM AND METHOD FOR THE PROVISION OF MULTIMEDIA MATERIALS

CROSS REFERENCE TO RELATED APPLICATIONS

This application claims priority to U.S. Provisional Application No. 61/577,642 filed on Dec. 19, 2011, entitled SYSTEM AND METHOD FOR THE PROVISION OF MULTIMEDIA MATERIALS.

TECHNICAL FIELD

The invention relates to apparatus and methods for creating augmented text-media files.

STATEMENT REGARDING FEDERALLY SPONSORED RESEARCH OR DEVELOPMENT (Not applicable)

BACKGROUND OF THE INVENTION

Today, many forms of media exist to convey information in both visual and audio formats. Modern communication technologies allow people from all over the world to share ideas, and as a result, demands for more sophisticated media formats have emerged. Fewer people each year simply sit down to "read a book" as modern technology allows for fully immersive multimedia experiences. With the demand for the creation of new multimedia experiences, there also comes a need for a collaboration and distribution tool to assist with the creation of modern media. It is also desirable to have a device that will bring people together for collaboration, assist with the creation of agreements between said people, and provide a means to secure the media once created.

SUMMARY OF THE INVENTION

In accordance with the invention, the inventive system comprises a webpage interface coupled to an information and support system, an account creation and login system, a user media storage system, a solicitation assistance and user matching system, a solicitation and collaboration agreement system, a media collaboration and project creation system, and a product gallery and sales system. Means are provided for a user to gain access to the inventive systems through an internet connection on a local user computing device.

The inventive systems input information into a database storage medium coupled to an operator system computing device which then combines the information into an augmented text-media file output. The inventive systems also distribute augmented text-media file output products to users of the inventive systems through a webpage interface system.

BRIEF DESCRIPTION THE DRAWINGS

Figure 1:
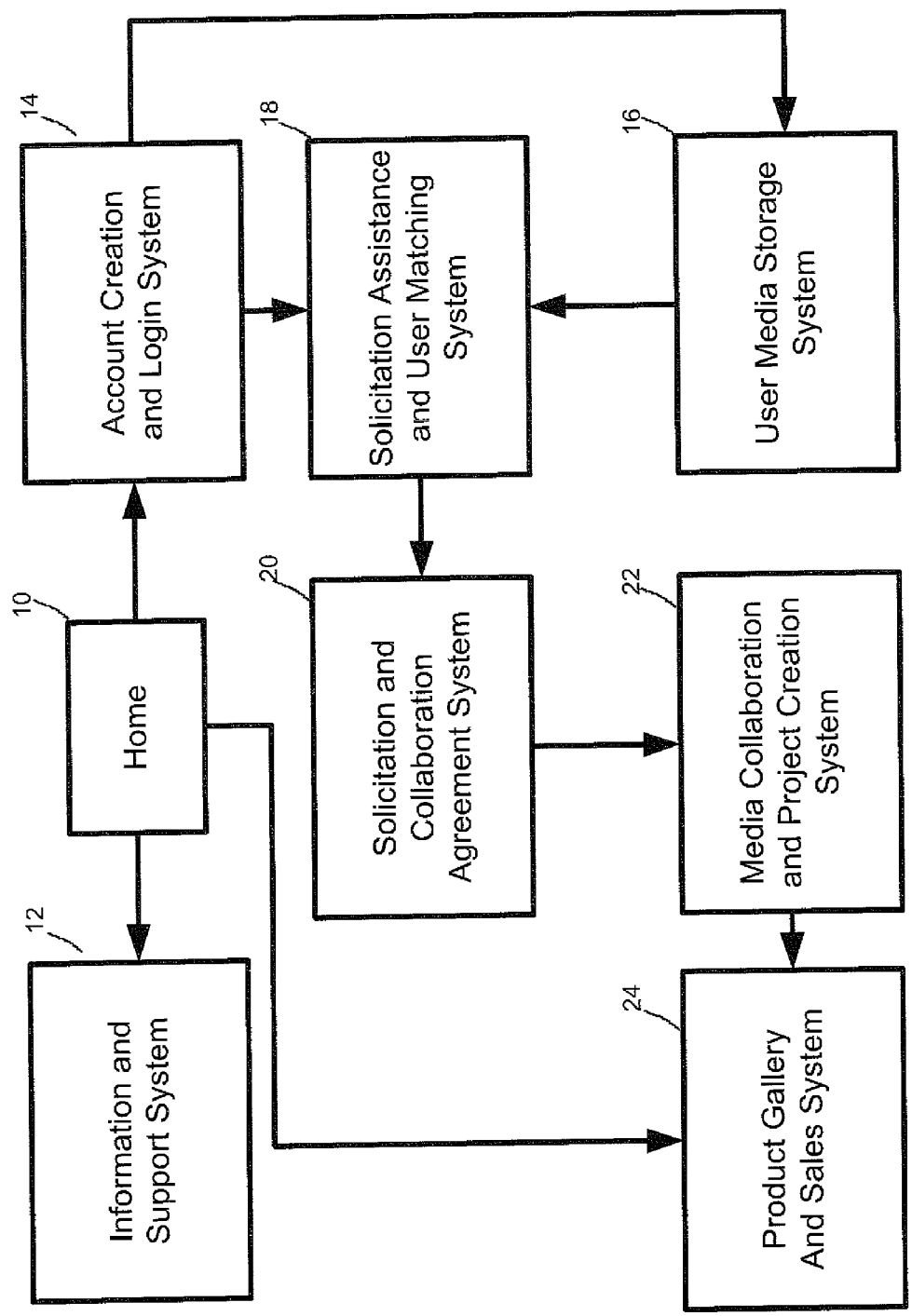
Figure 2:
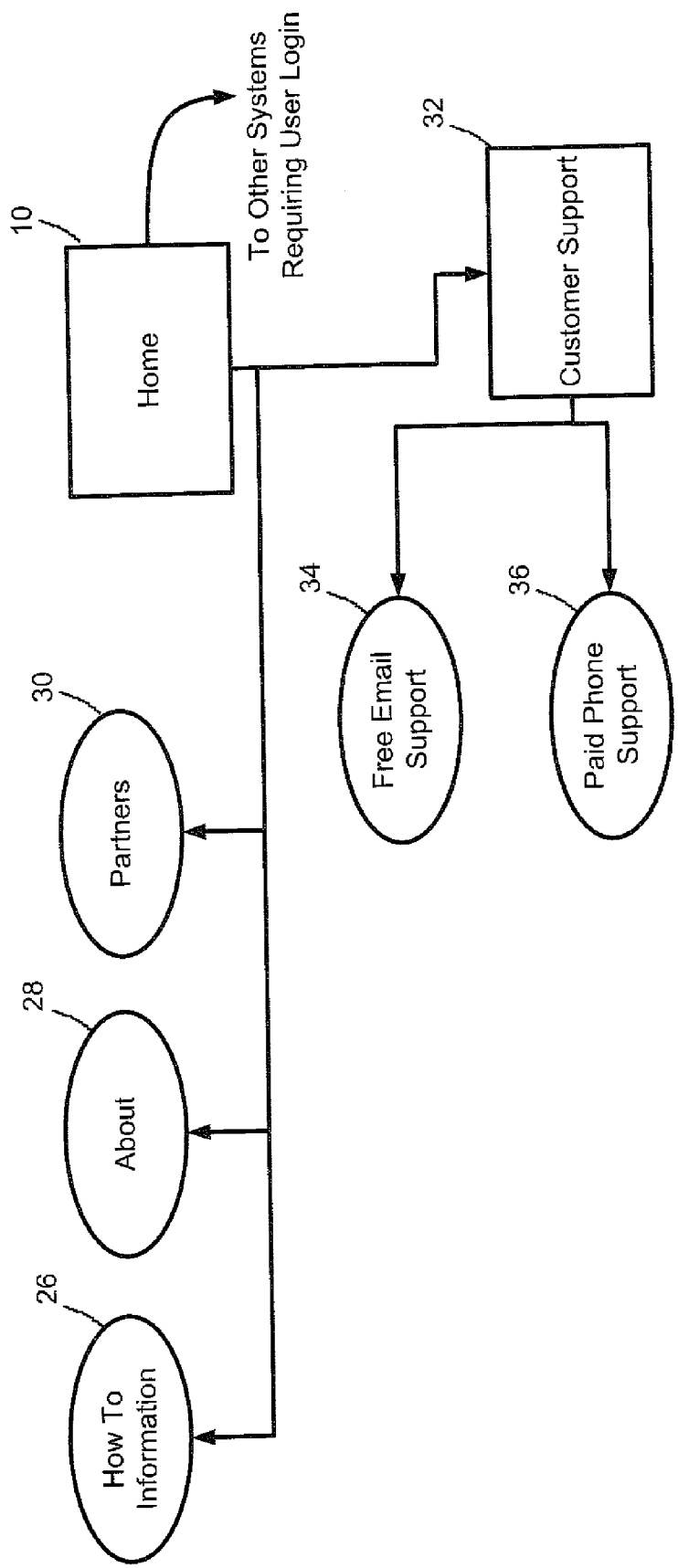
Figure 6:
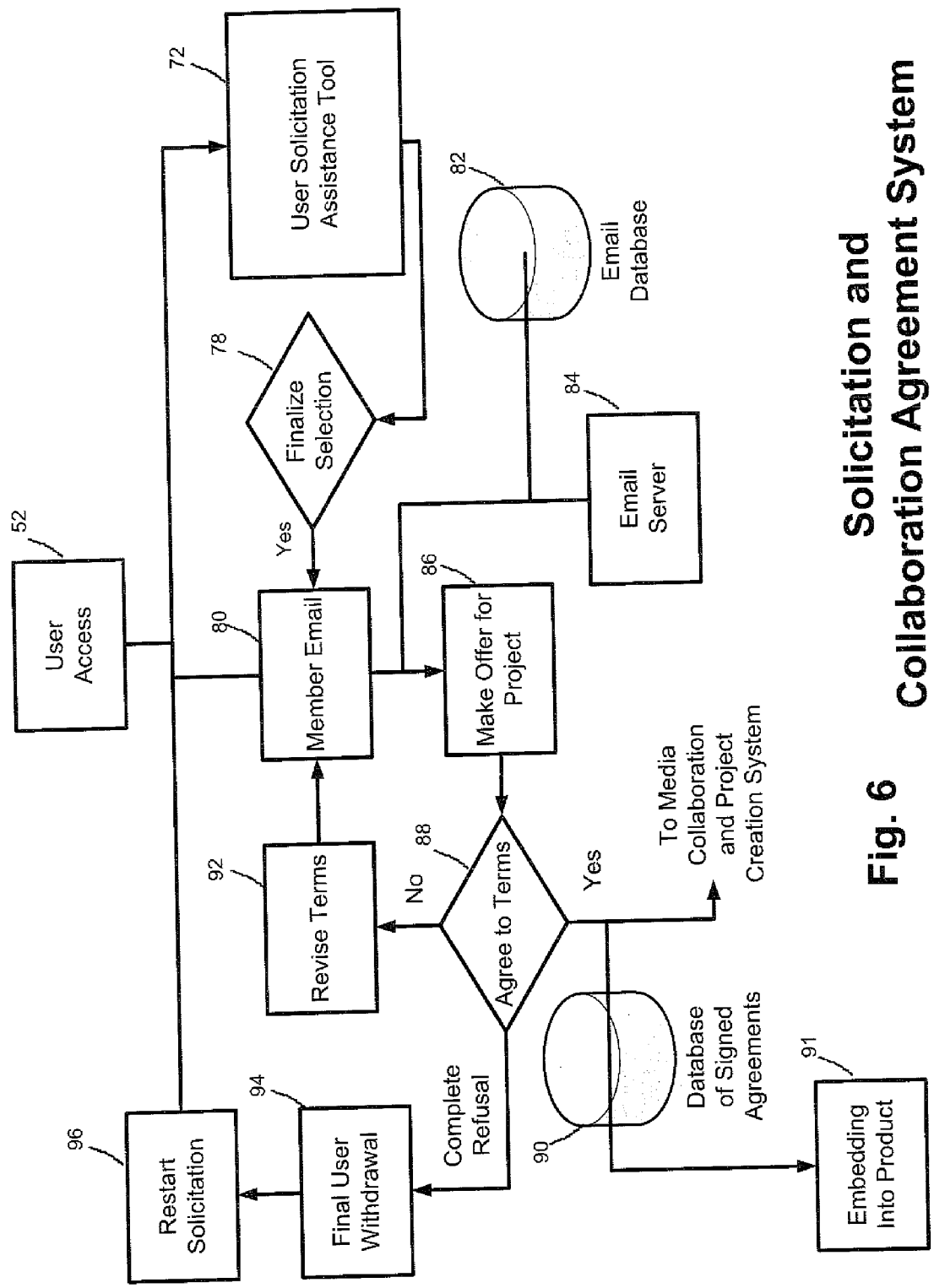
Figure 8:
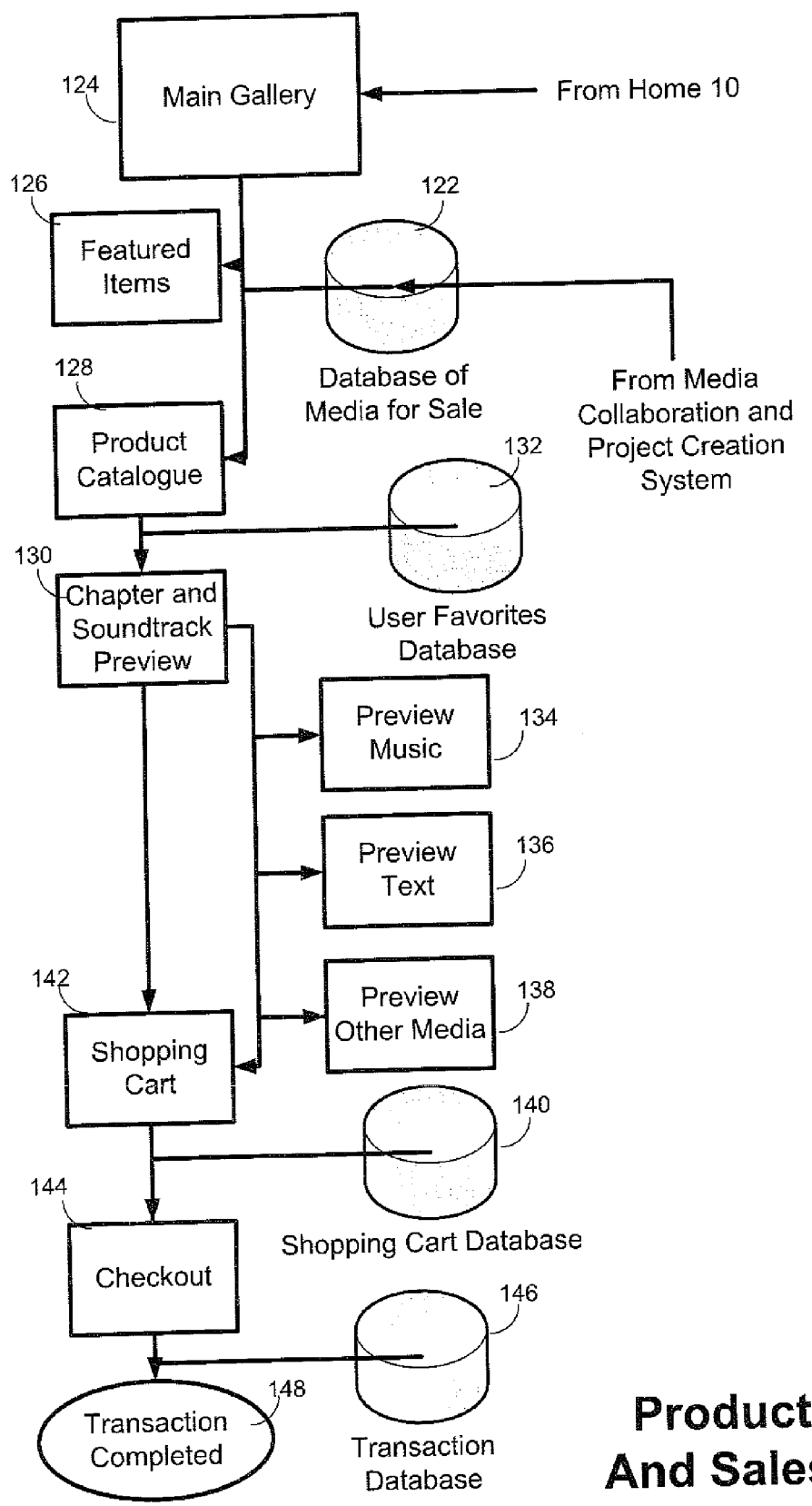
Figure 9:
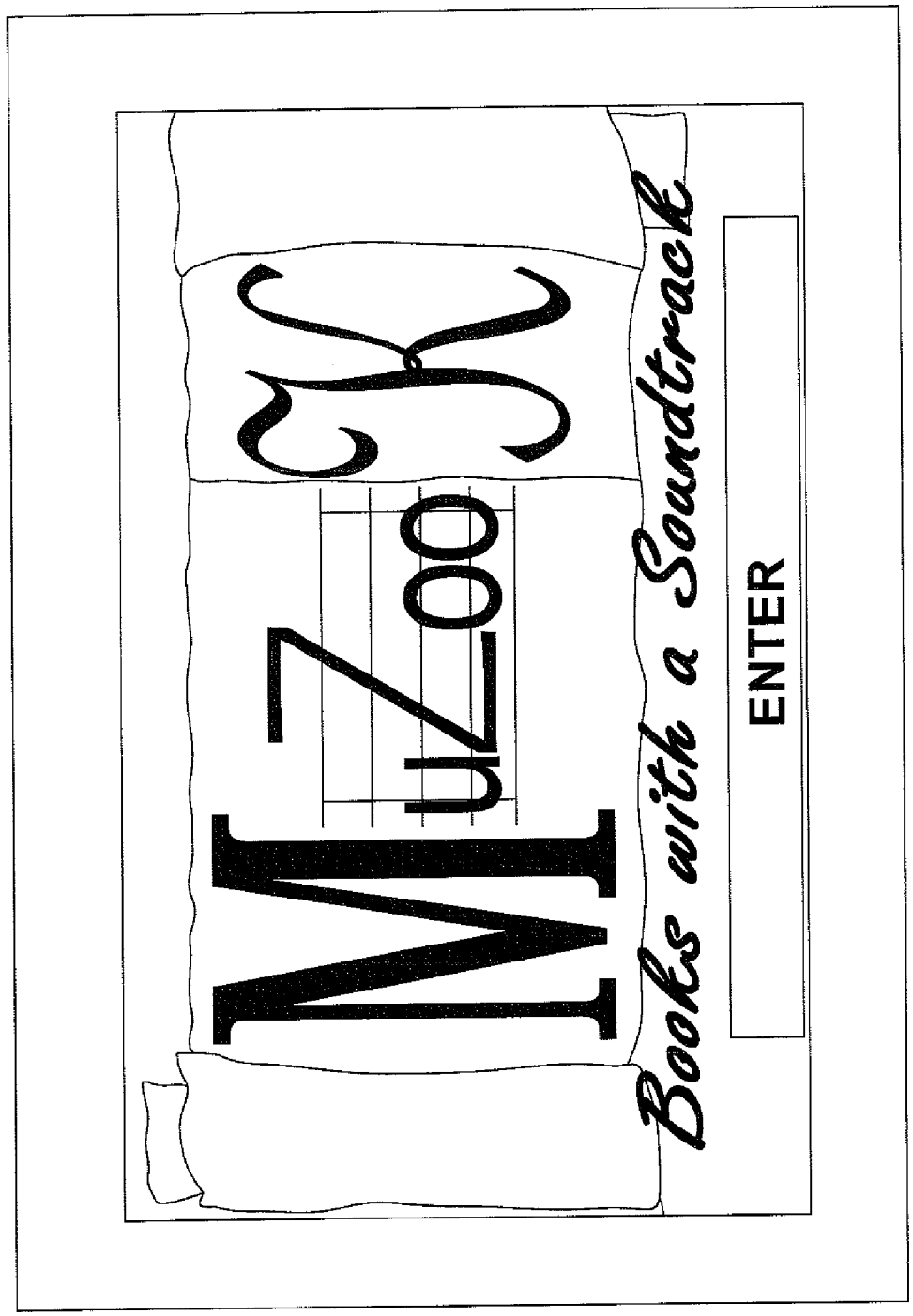
Figure 18:
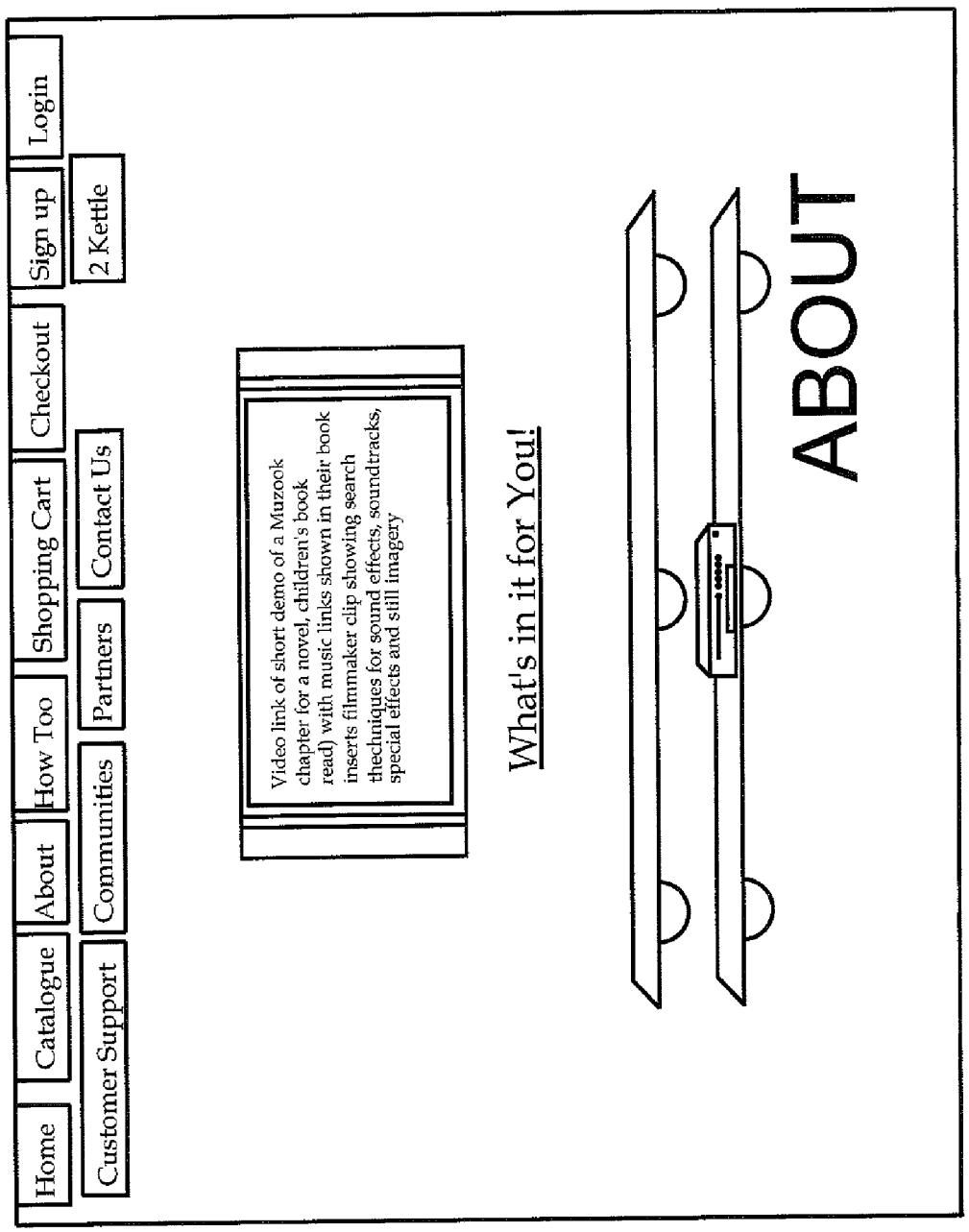
Figure 19:
Figure 20:
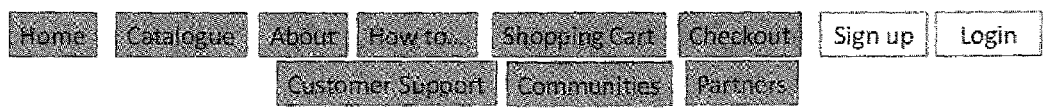
Figure 21:
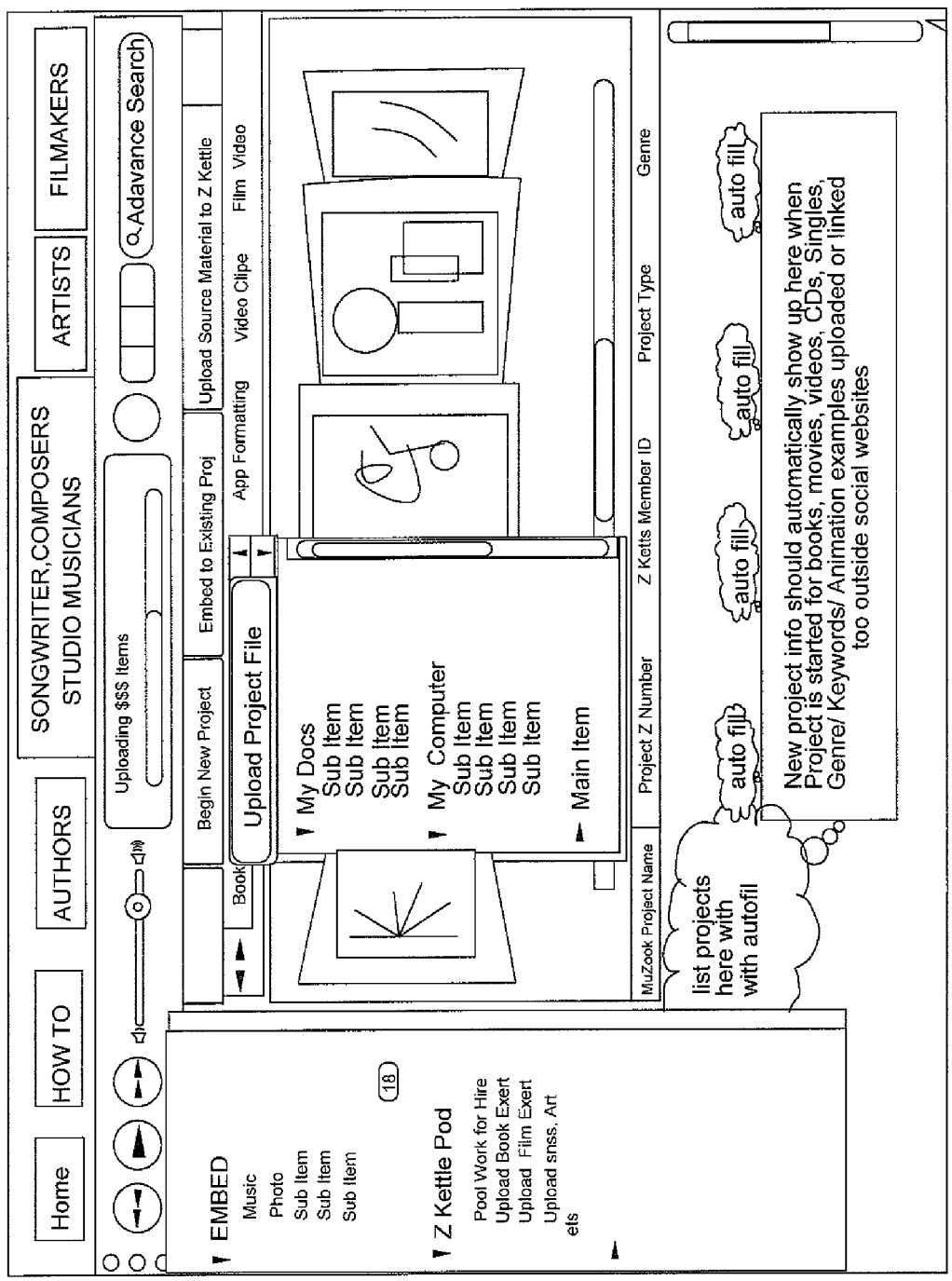
Figure 24:
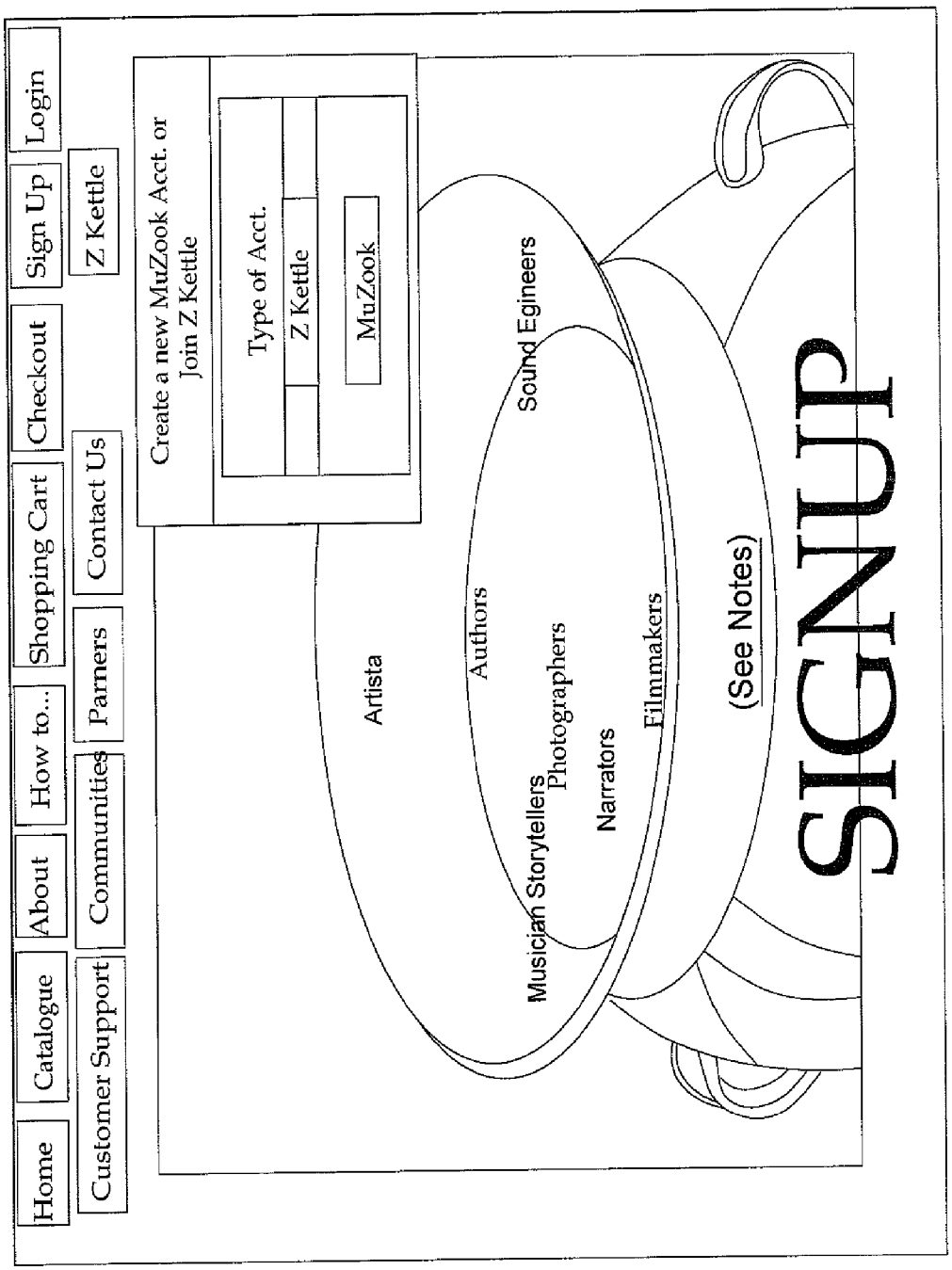
Figure 26:
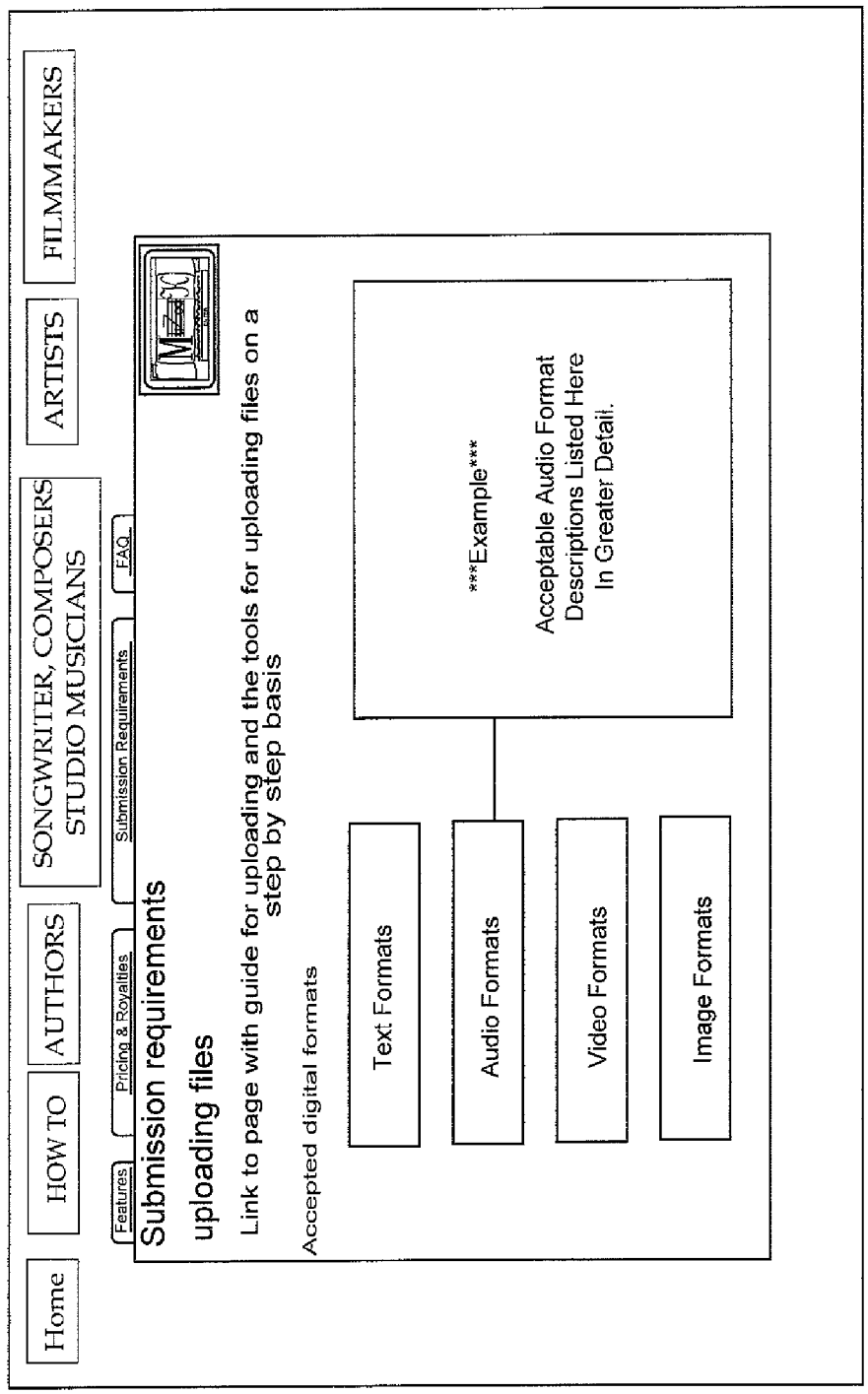
Figure 27:
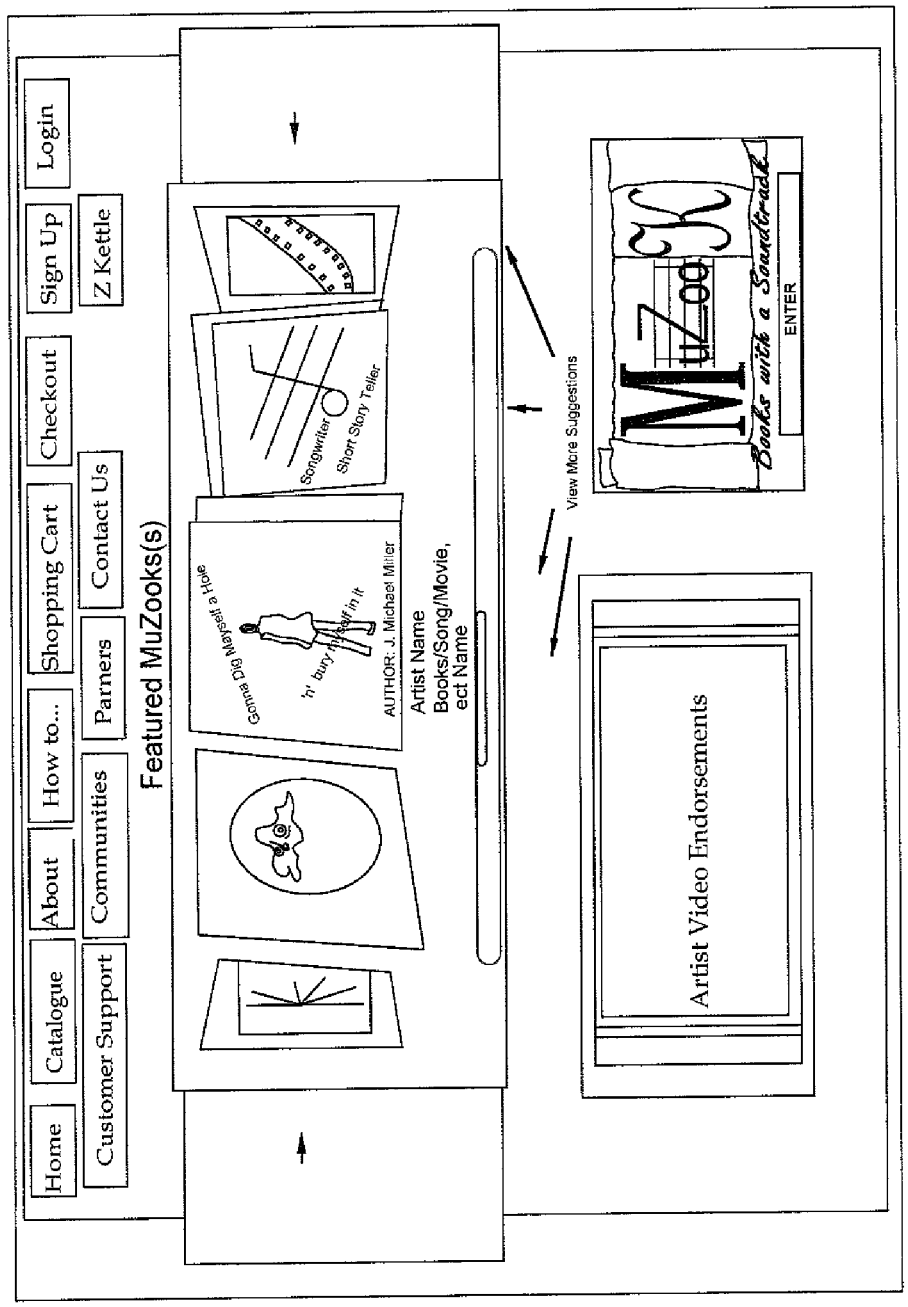
Figure 28:
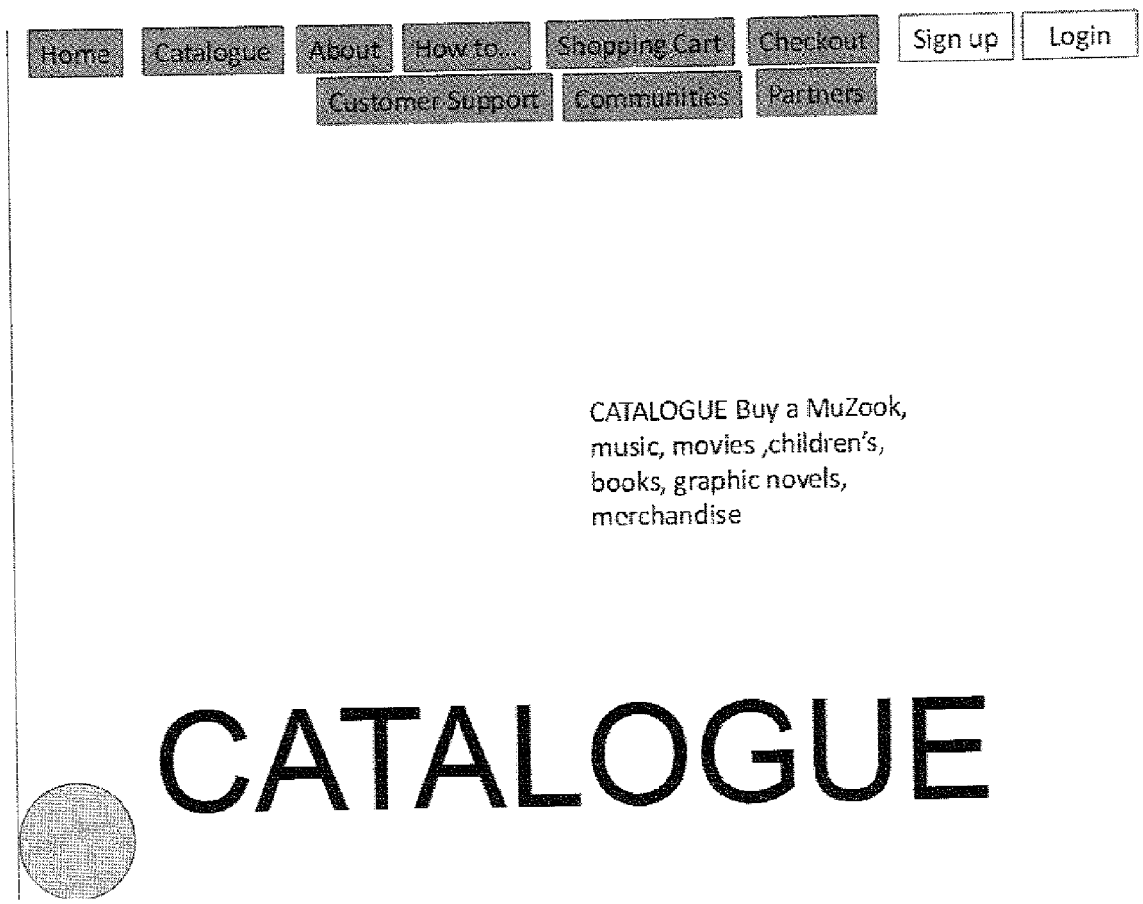
Figure 29:
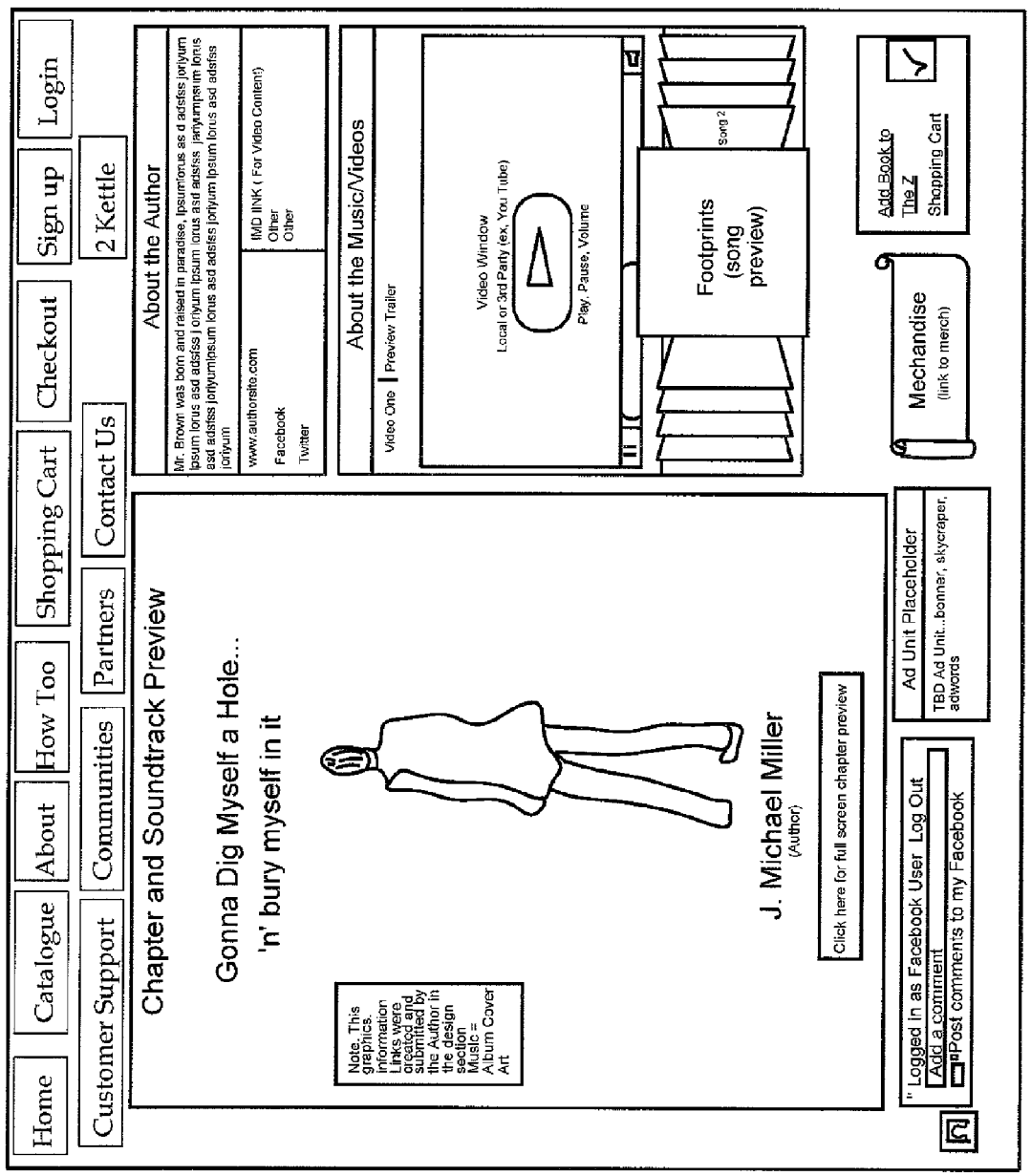
Figure 30:
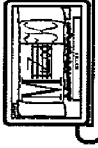
Figure 31:
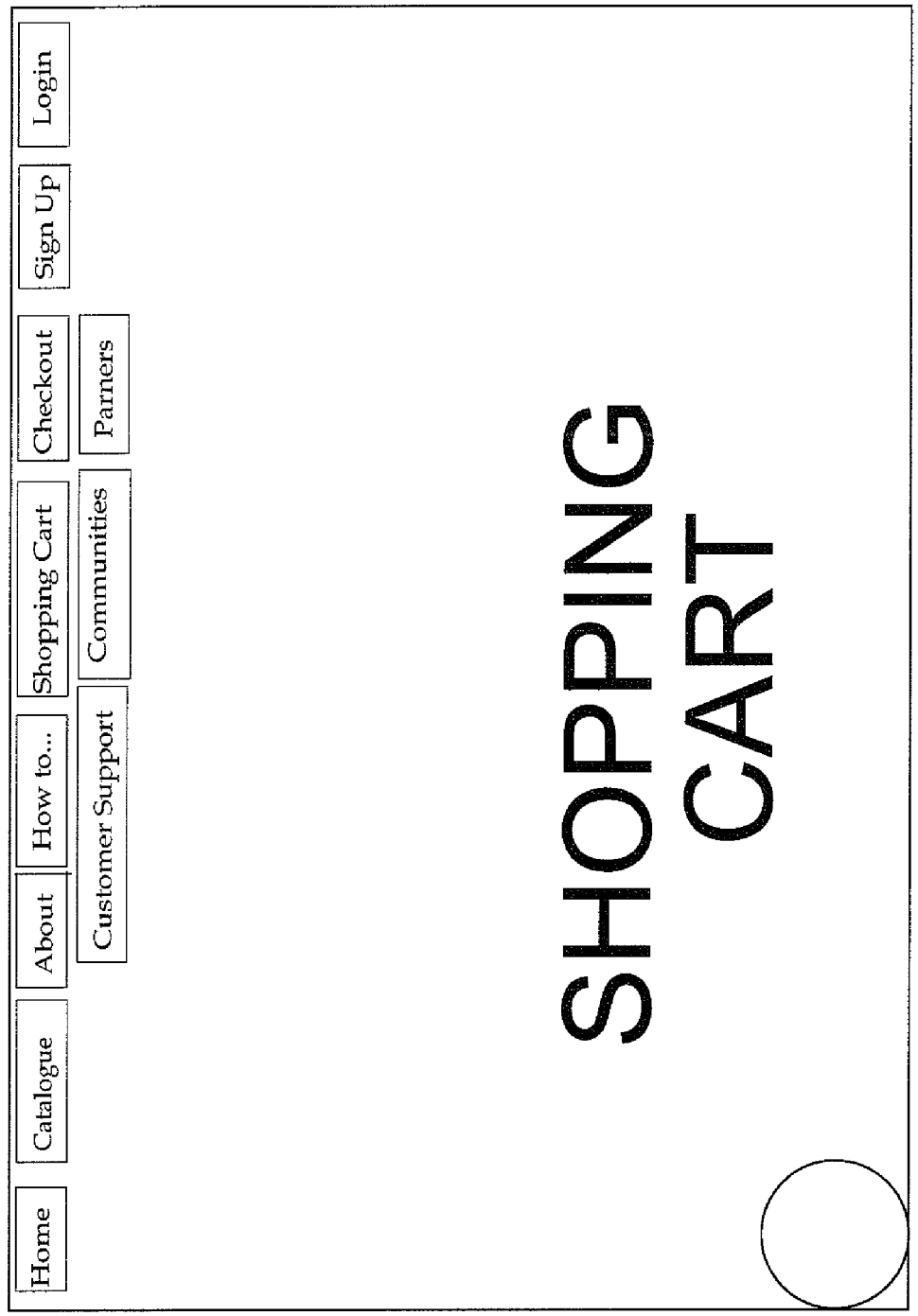
Figure 33:
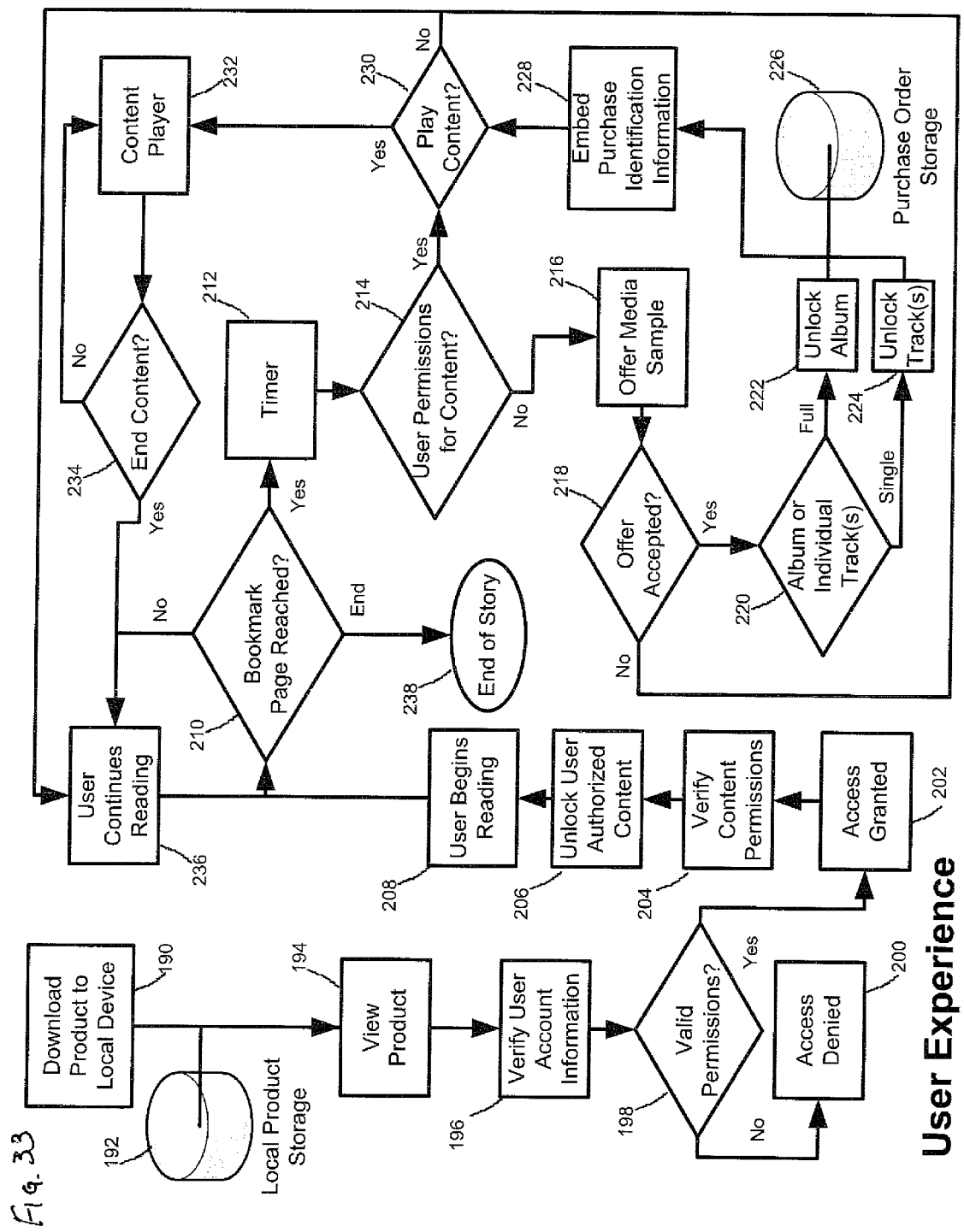

The invention may be understood from the following drawings of the preferred embodiment of the inventive system and method, in which:

FIG. 1 illustrates an overview of the systems comprising the invention;
FIG. 2 illustrates the information and support of system;
FIG. 3 illustrates the account creation and login system;
FIG. 4 illustrates the user media storage system;
FIG. 5 illustrates the solicitation assistance and user matching system;
FIG. 6 illustrates the solicitation and collaboration agreement system;
FIG. 7 illustrates the media collaboration and project creation system;
FIG. 8 illustrates the product gallery and sales system;
FIG. 9 illustrates the home page web interface;
FIG. 10 illustrates an introduction to the how to section;
FIG. 11 illustrates the authors category of the how to information system;
FIG. 12 illustrates the authors category of the how to information system may be further understood.
FIG. 13 the songwriters category of the how to information system;
FIG. 14 the song writers category of the how to information system may be further understood.
FIG. 15 illustrates the visual media user category of the how to information system;
FIG. 16 illustrates the filmmakers category of the how to information system;
FIG. 17 illustrates the filmmakers category of the how to information system;
FIG. 18 illustrates the about system;
FIG. 19 illustrates the partners system;
FIG. 20 illustrates the user interface of the customer support system;
FIG. 21 illustrates an option providing step by step instructions for uploading media;
FIG. 22 illustrates an optional user interface for user account creation;
FIG. 23 illustrates an optional user interface for user account creation;
FIG. 24 illustrates an optional user interface for user account creation;
FIG. 25 illustrates an optional user interface for user account creation;
FIG. 26 illustrates a user interface describing media formats acceptable for upload;
FIG. 27 illustrates an example of the main sales gallery system;
FIG. 28 illustrates an example of the catalogue user interface;
FIG. 29 illustrates an example of the chapter and soundtrack preview webpage interface;
FIG. 30 illustrates an optional interface for the media preview process comprising the preview music system;
FIG. 31 illustrates an example of a possible shopping cart interface;
FIG. 32 illustrates the generation and distribution of augmented text-media files; and
FIG. 33 illustrates the user experience.

DETAILED DESCRIPTION OF THE PREFERRED EMBODIMENTS

Referring to FIG. 1, a general methodology of the process used in the collaboration, creation, and sales of augmented text-media files can be understood. FIG. 1 also describes the relationship of the different systems comprising the invention with respect to one another. The methodology of the invention as illustrated in FIG. 1 is shown in greater detail in FIGS. 2-8.

Beginning at step 10, the user receives their first introduction to the augmented text-media through a home page web interface, as illustrated in FIG. 9. The FIG. 9 interface screen initially presents itself as an integrated artist development system used to create visual and audio enhanced ebooks in accordance with the present invention, as illustrated and described below. The FIG. 9 interface is a gateway for users to allow them access to the inventive system, which is done by clicking on the "Enter" link or button.

Referring to FIG. 1, it can be understood how users can access the information and support system 12, directly from the home page web interface 10, where users can receive assistance, ask questions, and view additional information. In order to gain full access to the augmented text-media or other systems comprising the invention, users must access the account creation and login system 14. Once an account has been created, users can access the user media storage system 16.

Users can connect with other users with similar needs using the solicitation assistance and user matching system 18 which matches potential collaborators and assists with communication. Once potential collaborators have been selected, the solicitation and collaboration agreement system 20 provides a means for the formation and enforcement of collaboration agreements, and ultimately the formation of a project collaboration group. A project collaboration group can then access the media collaboration and project creation system 22 which includes tools to assist in the creation of augmented text-media.

Completed projects can be submitted to the product gallery and sales system 24 which handles the storage and sales of completed projects. The product gallery and sales system 24 can be directly accessed from the home page web interface 10, if the user is already logged into their account.

Referring to FIG. 2, the process used in the information and support system referenced in FIG. 1, system 12, may be understood in greater detail. The processes comprising the information and support system can be accessed directly through the home page web interface step 10 by a user.

Users gain access to how to information 26 by selecting or clicking the how to information link or button incorporated in the invention's home page web interface 10. Once users gain access to the how to information system 26, users can interact with the how to information system 26 using a web page interface. The information and interface comprising the how two information system 26 is shown in greater detail in FIGS. 10-17.

Referring to FIG. 10, an introduction to the how to section may be understood. The introduction to the how to section is presented in the form of webpage 1001, and lists categories of supporting content creators, clients, and existing content suppliers as well as in-house artists and third party vendors and partners.

By referring to FIGS. 11 and 12, the authors category of the how to information system 26 may be understood. The author category comprises webpage 1101 and webpage 1201, of FIG. 11 and FIG. 12 respectively, which presents author needs analysis and site benefits for authors. Other how to information pertaining to authors is also included which describes the social networking aspect of the invention's systems and the benefits of social networking. Social networking benefits incorporated within the invention include the ability to create a unique user home page on the invention's web interface or webpage and the ability to include excerpts from the user's original augmented media content with links to the soundtrack supporting each excerpt. The process of including excerpts gives users the option of playing the excerpt of the augmented media's score from the various chapters of a given augmented text-media file before a purchase decision is made. Users can also provide links to various external websites such as Facebook, Twitter, YouTube, LinkedIn and others. Basic suggestions about membership options are also listed.

Referring to FIGS. 11 and 12, it may also be understood how information is presented to users by the how to information system 26 pertaining to editing, copywriting, and proofreading, including multiple copyediting plans and information referring to copywriting and editorial services in the form of webpage 1101 and webpage 1201. Webpage 1101 and webpage 1201 also incorporates instructions for uploading text based media as well as information to assist the user with choosing the most suitable plan for their creations. A needs analysis describing the use of stock photography is included with instructions for how to use the search functions contained within the invention's database tools as well as suggestions for the use of keywords to better find content that will meet a user's specific needs. Webpage 1101 and webpage 1201 also provides information referring to marketing and publishing distribution as well as information referring to how users can explore multiple marketing options including promotional trailers, press releases, as well as information about the creation of various marketing materials including but not limited to publicity kits and posters. Users can also explore marketing options in terms of their specific budget as well as how websites associated with the invention can help by providing sales opportunities through in-house services for tablets and electronic readers. Also described are online options for well defined marketing programs and options for working directly with in-house marketing agencies for the development of custom marketing plans for user augmented text-media content.

Referring to FIGS. 11 and 12 it may also be understood how the how to information system 26 provides additional information for authors to assist with the selection of design and illustration to augment the user's created media in the form of webpage 1101 and webpage 1201. Webpage 1101 and webpage 1201 provides information relating to how authors can utilize designers for book cover artwork, children's books illustrations, and the creation of marketing materials. Sample portfolio work from a variety of artists is displayed to provide examples. Each sample links to the artist's individual home page and provides information to assist authors with the task of determining what artistic style would best suit the user's project. Merchandising information is also presented as well as options for authors to work with in-house designers and production teams for the purpose of creating a variety of merchandise including but not limited to creation of memorabilia, stuffed animals, t-shirts, and posters. Merchandising information describes methods and options to allow all users involved in the creation of a particular augmented text-media project to benefit from a combined merchandising effort.

Referring to FIGS. 11 and 12, it may understood how the authors category of the how to information system 26 provides information for authors referring to the creation of video content promotional trailers to further augment their text-media in the form of webpage 1101 and webpage 1201. Webpage 1101 and webpage 1201 describes how users can generate excitement for the release of their augmented text-media beyond just a soundtrack. The advantages of multiple levels of user emersion are discussed as a means for fully utilizing the possibilities available within the augmented text-media format. Suggestions for collaboration with a full multimedia development team are described in webpage 1101 and webpage 1201 as well as options for working with partnered film studios to assist with the production and editing of video content.

Referring to FIGS. 13 and 14, the song writers category of the how to information system 26 mentioned in FIG. 2may be understood. The songwriter category is presented to the user in the form of webpage 1301 and webpage 1401, shown in FIG. 13 and FIG. 14 respectively, describes how songwriters can benefit from the use of photographs. This includes but is not limited to the use of tools built into the invention's systems that help users access an online library to create cd labels which can then be imported into the user's projects to augment the media that user creates. Webpage 1301 and webpage 1401 also describes how users can partner with professional photographers and how professional photography can provide benefit to media augmentation. Webpage 1301 and webpage 1401 also provides information about how songwriters can utilize graphic design and illustration. Webpage 1301 and webpage 1401 describes options for songwriters to partner up with other users or in-house artists to create visual media for the user's personal website, cd covers, or other promotional material. Examples of user and in-house submissions are provided that give direction for the access and use of said visual media and access to said artists and illustrators. Information is also provided about how visual media can be selected that best fits the user's work for promotional purposes or for social networking.

Referring to FIGS. 13 and 14, it may be understood how the songwriter category of the how to information system 26 provides information in the form of webpage 1301 and webpage 1401 describing how songwriters can benefit from marketing techniques that utilize embedded music. Webpage 1301 and webpage 1401 includes information pertaining to marketing in terms of providing music for download in the form of a single track or in the form of an entire soundtrack and discusses options for royalties and how such royalty agreements work. Webpage 1301 and webpage 1401 describes how soundtracks can be purchased after the fact during viewing of the augmented text-media files in real time. Links are also provided on webpage 1301 and webpage 1401 that direct songwriters to request forums where they can connect with authors who are requesting music for their creations.

Referring to FIGS. 13 and 14, it may be understood how the songwriter category of the how to information system 26 provides information in the form of webpage 1301 and webpage 1401 which describes publishing and distribution options as well as information for songwriters referring to how songs can be published and distributed through an in-house sales portal. Webpage 1301 and webpage 1401 also provides information referring to publishing and distribution through partner companies. Webpage 1301 and webpage 1401 also presents the benefits of embedding music in other media for the purposes of publication and distribution as well as the benefits of listing the music individually in a user database on the website for other users to find as well as individual sales. Webpage 1301 and webpage 1401 also provides information for songwriters about sound engineering, mixing, and mastering and explains the use of sound engineers to add effects, and presents advice regarding mixing music as well as formats for professional tools which would allow music to be embedded into an augmented text-media file format. Webpage 1301 and webpage 1401 also provides information relating to methods by which in-house engineers can assist with the mastering and publishing process for users and what formats are acceptable for upload in order to access said options. Webpage 1301 and webpage 1401 also provides information relating to various levels of engineering service and gives options such that users can select the level of assistance they require.

Referring to FIGS. 13 and 14, it may be understood how the songwriter category of the how to information system 26 in the form of webpage 1301 and webpage 1401 also provides information for songwriters relating to the collaboration process within the invention and how the invention's collaboration process can be used to combine a user's work with the work of other users from different backgrounds. Webpage 1301 and webpage 1401 describes the method by which collaboration projects evolve as projects develop and progress through the invention's collaboration process. Webpage 1301 and webpage 1401 provides information describing the account creation process and login procedure which allows access to collaboration tools and user matching options. Webpage 1301 and webpage 1401 provides information describing the process by which users can upload their music for other users to sample, review, and consider as well as how songwriter users can access author requests which are looking for music by which they can augment the author's text media.

Referring to FIGS. 13 and 14, it may be understood how the songwriter category of the how to information system 26 provides information to songwriters referring to producing their music in the form of webpage 1301 and webpage 1401. Webpage 1301 and webpage 1401 provides information relating to topics such as the use of successful music producers from major cities and labels and how songwriters can add extra elements to their music to make their creations combine better with the work from other users. Ideas are also discussed in webpage 1301 and webpage 1401 pertaining to the use of studio musicians to help finish production of submitted work. Webpage 1301 and webpage 1401 presents information relating to various levels of production assistance and in-house teams to help finalize user projects. Recording studios are also discussed in webpage 1301 and webpage 1401 from the perspective value to songwriters, and includes information relating to the use of touring musicians and partnerships with other companies for recordings. Webpage 1301 and webpage 1401 also provides information describing methods by which users can find a network of studios in the user's area or while on the road, as well as information about how studios can transfer individual sessions to an in-house main studio for assistance with the completion of user projects.

Referring to FIGS. 13 and 14, it may be understood how the songwriter category of the how to information system 26 in the form of webpage 1301 and webpage 1401 also provides information to songwriters regarding proofing. Webpage 1301 and webpage 1401 also provides information which describes methods by which songwriters can hire out their work to other performers and methods by which songwriters can go about coordinating creative efforts with authors and other users for inclusion within an augmented text-media product. Information is provided on webpage 1301 and webpage 1401 referring to the use collaborative processes and tools comprising the invention which allows users to work together and communicate in a secure environment, and discusses procedures comprising the invention by which users can create a final augmented text-media product within the invention's systems. Digital formatting is also discussed on webpage 1301 and webpage 1401 and how digital formatting pertains to songwriters, as well as how sessions are mixed, mastered, and formatted for sales in various formats chosen by the user. Information is presented in webpage 1301 and webpage 1401 relating to methods by which mastered songs are uploaded in various formats acceptable to media libraries contained within the invention's databases. Information is presented in webpage 1301 and webpage 1401 describing how additional formatting is offered to artists if needed, depending on the use within augmented text-media projects or use in direct sales through various sales channels, both contained within the invention's business process as well as through partner companies.

Referring to FIGS. 13 and 14, it may be understood how the songwriter category of the how to information system 26 in the form of webpage 1301 and webpage 1401 also provides information to songwriters referring to merchandising options and methods by which an in-house team of artists can be selected by the user to assist in the preparation of work ranging from promotional artwork, posters, cd artwork, t-shirts, and anything else the user can think of. Information is provided by webpage 1301 and webpage 1401 relating to methods by which users review the styles of various artists indexed within a database library of artists and how the users are directed to individual artist home pages by links associated with artist listings. Webpage 1301 and webpage 1401 provides information relating to users establishing contact with in-house art teams for the preparation and distribution of merchandise.

Referring to FIGS. 13 and 14, it may be understood how the songwriter category of the how to information system 26, in the form of webpage 1301 and webpage 1401, also provides information to songwriters relating to promotional trailers in the form of music videos and how music videos can be of benefit to songwriters. Webpage 1301 and webpage 1401 provides information relating to the use of music videos for the songwriter's single albums as a means of promotion as well as an example of successful collaboration using the systems contained within the invention's collaborative process. Information is also provided by webpage 1301 and webpage 1401 relating to methods by which users can work together with a songwriter in a group environment to determine the content of the music video and, depending on the user requesting the music video, various options for joint production, as well as how the music video can also be produced through in-house production teams. Information is provided by webpage 1301 and webpage 1401 which also describes how songwriters can benefit from animation, and explains how users can choose to animate portions of their music video using content contained within the invention's libraries, produce content in conjunction with a promotional trailer for the augmented text-media product, or create original work. Information is also provided by webpage 1301 and webpage 1401 which explains how users can choose from options available for various levels of animation and how it might be included within a music video.

Referring to FIGS. 13 and 14, it may be understood how the songwriter category of the how to information system 26, in the form of webpage 1301 and webpage 1401, also provides information to songwriters relating to the use of sound effects in songwriter projects. Information is provided by webpage 1301 and webpage 1401 describing methods by which users choose from a list of sound effects included in libraries or how in-house engineering and production teams can augment user recordings with professional effects. Information is provided by webpage 1301 and webpage 1401 which discusses the acceptable formats for users to upload audio files and how users can choose from various sound effect options, both included within libraries, and custom created by other users or in-house engineering teams and specialists.

Referring to FIGS. 13 and 14, it may be understood how the songwriter category of the how to information system 26, in the form of webpage 1301 and webpage 1401, also provides information relating to policies stating that lyric sheets and musician credits must be included with any song uploaded to any library associated with the invention. Information is also provided by webpage 1301 and webpage 1401 relating to options for submitting lyrics and music credits and how said lyrics and music credits can be viewed by users when uploading music to a library associated with the invention.

Referring to FIGS. 13 and 14, it may be understood how the songwriter category of the how to information system 26, in the form of webpage 1301 and webpage 1401, also provides information referring to the creation of short stories, novels, or autobiographies pertaining to the true life or fictional story behind the creation of user content which can then be added to an augmented text-media project for further enhancement. Information is also provided webpage 1301 and webpage 1401 relating to ideas for pricing options of different forms of media as well as options for the creation of augmented short stories and smaller productions. The use of embedding tools are discussed in webpage 1301 and webpage 1401 as well as how users can get assistance with editing and design in order to improve the final quality of their creations.

Referring to FIG. 15, it may be understood how the artists, illustrators, animators, and photographers category of the how to information system 26, in the form of webpage 1501, provides information for users involved in the creation of visual media. Webpage 1501 provides examples of user submissions and provides instructions to users relating to the process of uploading a user portfolio or individual media samples to online libraries. Information is also provided by webpage 1501 explaining that visual media submissions can be used for evaluation purposes or placed for sale to the public, to other users, or included in larger augmented media projects. Webpage 1501 provides instructions relating to methods by which users can submit confidential proposals through communication elements involved in the invention's systems which allow users to contribute ideas and artwork towards the creation of future augmented text-media projects. Information is also provided by webpage 1501 relating to which file formats are acceptable for user submissions when uploading user portfolios or other examples of visual media including, but not limited to, photographs, artwork, illustrations, animations, and other visual media. Webpage 1501 provides information relating to methods by which a user can license said user's artwork and visual media to other users or to the public. Information is also provided by webpage 1501 relating to methods by which users working with visual media can combine efforts with authors working with text to create an augmented text-media project.

The webpage 1501 of FIG. 15 also provides information for visual media users relating to distribution options. Webpage 1501 provides information about how users can offer their work for sale to the general public through online sales as well as through partner companies. Webpage 1501 also describes which file formats are acceptable for visual media submissions that will be displayed in online libraries included within the invention and how said visual media submissions can be linked to a user's home page. Webpage 1501 provides information relating to methods by which users can establish pricing through license agreements, instructions for the creation of links to user media, and information regarding methods by which users work with partner companies.

Webpage 1501 FIG. 15 also provides information for visual media users about design. Webpage 1501 describes methods by which users can submit ideas to authors who have requested proposals for artwork or have provided sample chapters to read in anticipation of receiving creative ideas, and how submitted ideas can lead to a collaborative augmented media project. Webpage 1501 talks about the benefits to users of being a registered member of services incorporated in the invention and how only registered members have full access to the services and processes comprising the invention. Webpage 1501 also provides information about request submissions for work based on other work previewed in online libraries.

Referring to FIG. 15, it may be understood how webpage 1501 also provides information for visual media users about formatting of said visual media users' created visual media. Webpage 1501 lists acceptable formats for media submissions as well as information about reformatting visual media into acceptable formats. Webpage 1501 explains benefits to uploading visual media in various formats as well as options that are available to sell said visual media, pricing options, and licensing to third parties. Webpage 1501 goes on to give information about merchandising of visual media, marketing of products through the use of user web pages, options for posters, postcards, various photo sizes, t-shirts, and how users can create original merchandising ideas. Webpage 1501 explains how to create links to libraries which preview the user's illustrations, artwork, and other visual media such that other users can more easily find said visual media as well as information about embedding user created visual media into other forms of media to create an augmented media product. Webpage 1501 also provides information about how purchasers of the user's work have options based on the visual media that is submitted and how different levels of digital quality affect the final downloaded product. Webpage 1501 also provides information about how different forms of visual media are suited to work with particular forms of merchandising.

Referring to FIG. 15, it may be understood how webpage 1501 also provides information for visual media users about animation. Webpage 1501 explains methods by which animators display created media within said animators' user webpage and how individual media uploads are sold directly to the general public. Webpage 1501 gives examples about children's book authors, graphic novelists, and comic book writers, and how methods which take advantage of a user's animated visual media to incorporate said media within a graphic-text based media project to further augment said graphic-text based media project into a more complete augmented text-media experience.

Referring to FIG. 16, it may be understood how webpage 1601 provides information for filmmakers about editing, sound engineering, mixing, sound effects, special effects, and how users go about choosing from a list of partner companies, or review submitted media from editors listed in online libraries and submissions from other users to include in a film media project. Webpage 1601 also provides information about how users can view special effects clips, which are available in online libraries comprising the invention's systems, for use in user film media projects and how users can view terms and license agreements from other users, and from partner companies, as well as how users go about soliciting the services of artists, engineers, and film editors. Webpage 1601 also provides information for filmmakers about how users go about requesting proposals for work based on budget, from other users, or from preset in-house packages.

Webpage 1601 of FIG. 16 also provides information for filmmakers about photography and how photography is used for cover art or scene effects to enhance user filmmaking creations. Webpage 1601 explains how users go about choosing from online libraries or requesting new work from other users based on the type of film said filmmaking user is creating. Further information is provided in webpage 1601 about marketing and methods by which a filmmaker chooses options to rent or sell said filmmaker's videos. Webpage 1601 provides information to filmmakers about how films are presented to partner companies, production companies, and film studios as well as the creation of pres kit packages, press releases, and other promotional options. Information is presented in webpage 1601 relating to how films are listed for download on various websites while selling the final product through sales channels incorporated within the invention's systems. Webpage 1601 provides information about how films are listed according to category and genre, and methods by which users choose marketing plans that best fit a film's particular genre, and how said marketing plans are created with the assistance of other users or through in-house marketing production.

Referring to FIG. 16, it may be understood how webpage 1601 also provides information to filmmakers relating to design, graphic artists, and methods by which users work together with other artists through communication systems incorporated in the invention to create unique designs for film artwork, dvd covers, posters, and promotional material. Webpage 1601 provides information relating to methods by which users choose from existing online libraries, choose from in-house plans, or seek proposals from other users.

Referring to FIG. 16, the information provided to filmmakers in the form of webpage 1601 relating to recording studio, soundtrack options, and film scores may be understood. Webpage 1601 provides information relating to searching online resources incorporated in the invention to find local recording studios, partner companies for recording original soundtracks and film scores, and working with other users for collaboration. Webpage 1601 provides information relating to request proposals for film scores by other users and by budget. Webpage 1601 provides information relating to methods by which filmmakers preview samples of other users' audio work, either from musicians or composers. Webpage 1601 provides information relating to methods by which film makers contact professional songwriters, partner with publishing companies, recording studios, composers, studio musicians, and vocalists to create the music for their film projects.

Webpage 1601 of FIG. 16 also provides information to filmmakers relating to copywriting. Webpage 1601 provides information relating to methods by which filmmakers take advantage of an in-house team of copywriters for press releases and other advertising as well as the creation of marketing material. Webpage 1601 provides information relating to in-house press packages and assistance in the preparation of a user's marketing packages. Webpage 1601 also provides information for filmmakers relating to methods by which filmmakers seek proposals from other users based on said filmmaker's budget. Webpage 1601 of FIG. 16 also provides information to filmmakers relating to merchandising, and methods by which in-house teams or partner companies are utilized for the design, creation, and distribution of merchandise related to said filmmaker's unique creations. Webpage 1601 also provides information for filmmakers relating to methods by which filmmakers use merchandising to help market films. Webpage 1601 also provides information relating to the use of request proposals for work and how said proposals can be defined within communication and social networking systems incorporated in the invention's systems; and how various elements of merchandising relate back to said filmmaker's creations.

Referring to FIG. 17, it may be understood how webpage 1701 provides information to filmmakers relating to methods by which filmmakers go about creating promotional trailers and how filmmakers request proposals for promotional trailers. Webpage 17 provides information to filmmakers relating to methods by which filmmakers take advantage of the skills of other users, partner companies, and the use of in-house packages. Webpage 17 also provides information relating to methods for uploading films into online libraries and how users go about making a request for proposals from other users.

Webpage 17 of FIG. 17 also provides information to filmmakers relating to methods by which videos are uploaded for the purposes of collaboration with other users to assist with refinement, design, marketing, and augmentation when combined with other forms of media. Webpage 17 also provides information to filmmakers relating to options available to users when uploading videos for purposes of sale and rental, marketing options, digital formatting, and other options related to video including video demos to other users for the purpose of filmmakers seeking additional work from other users.

Webpage 17 of FIG. 17 also provides information to filmmakers relating to digital formatting and how different digital formats and applications are used in different situations. Webpage 17 provides information relating to the use of tablet pc's and how tablet pc's affect the way videos are experienced by viewers. Webpage 17 provides information to filmmakers relating to methods by which filmmakers choose an acceptable format for uploading said filmmakers' created videos and how said filmmakers go about selecting from a list of packages for different forms of digital formatting and tablet application creation depending on the desire of said filmmaker, as well as how said package and formatting selections affect the collaboration with other users, and the process of seeking proposals from other users.

Referring to FIG. 17, it may be understood how webpage 17 also provides information to filmmakers relating to the use of collaborative processes incorporated in the invention's systems to collaborate on projects with other users. Webpage 17 provides information about how groups of users can be formed to take advantage of the diverse skills of individual users, how collaborative projects can evolve and change shape as technology evolves, and the many options available for the creation of new augmented text-media projects. Webpage 17 provides information relating to systems that only allow registered users to participate in the collaborative process, upload media, and request submittals.

Referring back to FIG. 2, the information and support system, it may be understood how users may gain access to the about system 28 directly from the home page 10. The about system 28 provides additional information to users about the systems and methods comprising the invention. The about system 28 presents information in the form of a webpage which may be understood by referring to FIG. 18. Webpage 1801 of FIG. 18 provides information to users relating to topics such as video examples of children's novels that scroll through mock ups of book pages with integrated music links. Webpage 1801 also suggests methods by which a video is used as a visual aid to explain a unique product offered on a website beyond that of an actual book. Webpage 1801 also displays an example of an augmented text-media product in a completed form for users to view.

Referring back to FIG. 2, it may be understood how users gain access to the partners system 30 directly from home page 10. The partner system 30 may be understood in greater detail by referring to FIG. 19 which shows how webpage 1901 displays a list of legitimate partner companies and contact information. Webpage 1901 displays the credentials of partner companies and gives users access to a summary of partner company information. Webpage 1901 is updated as new companies join or old companies leave as well as presents additional information to users relating to the partner companies such as what role each partner company plays with regard to the systems and processes comprising the invention.

Referring back to FIG. 2, user access to customer support options may be understood. Users access customer support system 32 directly from the invention website's home page 10. Users interact with the customer support system 32 in the form of a webpage interface which can be understood by referring to FIG. 20 which presents a view of the webpage interface in the form of webpage 2001. Webpage 2001 describes user access to free email support or paid phone support. Referring back to FIG. 2, the connection may be understood between customer support system 32, free email support system 34, and paid phone support system 36. Users begin by gaining access to the customer support system 32 and then make a choice between the free email support system 34 and the paid phone support system 36.

Referring back to FIG. 1, it may be understood how a user gains access to the account creation and login system 14 directly from the home page 10. The systems comprising the account creation and login system 14 may be better understood by referring to FIG. 3. Referring to FIG. 3, the user would first gain access to the account creation and login system from the home page 10 of the invention's website. User access acquisition begins with the user accepting the invention's terms of use 38. Terms of use 38 describes what actions are permissible by users and what actions are not permissible as well as the penalties used to enforce the terms of use in the form of a webpage. The webpage of terms of use 38 also describes acceptable use of the systems comprising the invention. The webpage of terms of use 38 also describes unacceptable use of the systems comprising the invention as well as the penalties used to enforce acceptable use of the systems comprising the invention. Any user who does not accept the terms described in the webpage of terms of use 38 is denied access to the invention's website.

Once a user accepts the terms of use 38, the user will be prompted by a webpage or application window to create a new user account using account creation system 40, or log into an existing user account using login system 42. New users who do not already have an existing user account will be required to create a new user account before gaining further access to the invention's website and systems comprising the invention. In order to create a new account, the new user must access the account creation system 40, which begins by requiring the new user to enter personal information into an online form which. Required personal information includes but not limited to the new user's full name, physical address, email address, and a desired user identification name for the purpose of interactions within the website as well as when the new user is involved in communication with other users. The online form of account creation system 40 also prompts the new user to create a password which will be used to secure access to the new user's account. The account creation system will not allow a user to proceed further unless all required information is entered in the online form. An example of a user account creation screen can be understood by referring to FIGS. 20 through 25 which diagram layouts of possible user account creation webpages.

Referring back to FIG. 3, it may be understood how, once preliminary user information is gathered and a user account has been created by the account creation system 40, the new user will need to choose what type of account the new user desires. Account type is determined when the new user accesses the account type designation system 44 may. The account type designation system 44 requires new users to select options that determine if the new user's primary purpose is to purchase product or create and/or sell product. If the new user's primary goal is to create media, the user will be required by the account type designation system 44 to describe the type of media the new user will be creating by entering descriptions in an online form associated with the account type designation system 44 as well as selecting a series of options which will allow the search functions incorporated within the systems comprising the invention to better index the new user's information.

Once the new user finalizes all required account creation information, the security key generation system 46 generates a unique, user specific, internal security key code that is specific to the new user. The user specific, security key codes, generated by the security key generation system 46, are used internally by the different systems comprising the invention to secure any communication that users are involved in as well as secure any media users upload to the system as well as any collaborative work users participate in the creation of. The users, themselves, never directly access security key codes since security key codes are used by the background functions of the inventive systems to keep track and verify user activity and user content management.

All of the information relating to a user account is stored in the user account database 48. The user account database 48, keeps track of user account information and security key code, keeps a record of user associations with other users, keeps a record of the location of user files that have been uploaded to the systems comprising the invention, and keeps a record of other useful information associated with user accounts.

Once a user has created a user account associated with the invention's website, or should a user already have an existing user account associated with the invention's website, a user may choose to log in to the invention's website using the login system 42. The login system 42 will use a webpage or application window to prompt a user to enter the user's account credentials including user name and associated password. The entered account credentials will be checked against the account information stored in the user account database 48 and the attempt to log in is recorded in the login database 50. The login system 42 will also record certain verification information including but not limited to the ip address of the computer that a user is logging in from and compare it against any previous login information stored in the login database 50 as well as compare additional security verification information that a user could be prompted to answer, if deemed necessary by the login system 42, for additional confirmation of a user's identity against user information stored in the user account database 48.

Once a user satisfies all login requirements, the login system 42 will grant user level access 52 to the user and the login database 50 will record the transaction including but not limited to information about the user's ip address, date and time of login, security questions answered, and other information that could be used by the login system 42 to help identify the user during future login attempts. User level access 52 will grant a user access to the full features of the systems incorporated in the invention through the invention's website interface. The relationship between user level access 52 and the other systems comprising the invention may be understood by referring back to FIG. 1 which diagrams a user, having satisfied the account creation and login system 14, gaining direct access to the user media storage system 16, solicitation assistance and user matching system 18, product gallery and sales system 24, and indirect access to the solicitation and collaboration agreement system 20 and the media collaboration and project creation system 22.

Referring to FIG. 4, the user media storage system may be understood. As mentioned above, a user is granted direct access to the user media storage system once a user has gained user level access to the systems comprising the invention. User level access is experienced by users through a webpage interface similar to the home page 10 of FIG. 1 except that user level access discussed above allows additional buttons and features to become available for user selection. Users first gain access to the user media storage system by selecting an option or clicking a button to gain access to the edit user information system 54. The option to access the edit user information system 54 by clicking a webpage link or button only becomes available for selection by users once user level access has been achieved. Once a user gains access to the edit user information system 54, a user has the option to upload a variety of media types to storage databases incorporated in the invention's systems. Users may upload any form of media so long as the media is in an acceptable format as described previously in the how to section of the invention, diagramed in FIG. 10 through FIG. 17. Referring to FIG. 21, an option providing step by step instructions for uploading media which is viewable to users in the form of webpage 1701 during media upload may be understood. The upload of any media by a user would be subject to the terms the user previously agreed to during the acceptance of terms 38 of FIG. 3.

Referring back to FIG. 4, the process by which a user selects the option to access the upload music process 56 may be understood. The option to access the upload music process 56 is only available to users who are logged in with user level access, and users directly access to the upload music process 56 through the edit user information system 54. During the music upload process 56, a webpage interface prompts the user to select a music file, of a compatible format, from a local source to be uploaded to the invention's system. The local source can take the form of a personal computing device with Internet access and a compatible web browser or compatible upload application. Once the user selects the desired music file, the music file is transmitted from the user's local source to the upload music process 56. The upload music process 56 prompts the user to enter any desired information describing the uploaded music file in an online form, and gives the option for the user to finalize selection and submit the music file to the upload music process 56 for storage. All uploaded music files are embedded with the security key code, described in the generate security key code process 46 of FIG. 3, of the uploading user; and the music file is then stored and indexed in the music database 58 and made available for cross-referencing by other systems incorporated in the invention. The upload music process 56 can also allow users to upload music files to the music database 58 from a compatible online source or another music storage system that is acceptable to the requirements of the user media storage system as described in webpage 2601 of FIG. 26.

Referring back to FIG. 4, the process by which a user selects the option to access the upload stories process 60 may be understood. The option to access the upload stories process 60 is only available to users who are logged in with user level access, and users directly access to the upload stories process 60 through the edit user information system 54. During the upload stories process 60, a webpage interface prompts the user to select a text file, of a compatible format, from a local source to be uploaded to the invention's system. The local source can take the form of a personal computing device with Internet access and a compatible web browser or compatible upload application. Once the user selects the desired text file, the text file is transmitted from the user's local source to the upload stories process 60. The upload stories process 60 prompts the user to enter any desired information describing the uploaded text file in an online form, and gives the option for the user to finalize selection and submit the text file to the upload stories process 60 for storage. All uploaded text files are embedded with the security key code, described in the generate security key code process 46 of FIG. 3, of the uploading user; and the text file is then stored and indexed in the stories database 62 and made available for cross-referencing by other systems incorporated in the invention. The upload stories process 60 can also allow users to upload text files to the stories database 62 from a compatible online source or another text storage system that is acceptable to the requirements of the user media storage system as described in webpage 2601 of FIG. 26.

Referring back to FIG. 4, the process by which a user selects the option to access the upload images process 64 may be understood. The option to access the upload images process 64 is only available to users who are logged in with user level access, and users directly access to the upload images process 64 through the edit user information system 54. During the upload images process 64, a webpage interface prompts the user to select an image file, of a compatible format, from a local source to be uploaded to the invention's system. The local source can take the form of a personal computing device with internet access and a compatible web browser or compatible upload application. Once the user selects the desired image file, the image file is transmitted from the user's local source to the upload images process 64. The upload images process 64 prompts the user to enter any desired information describing the uploaded image file in an online form, and gives the option for the user to finalize selection and submit the image file to the upload images process 64 for storage. All uploaded image files are embedded with the security key code, described in the generate security key code process 46 of FIG. 3, of the uploading user; and the image file is then stored and indexed in the images database 66 and made available for cross-referencing by other systems incorporated in the invention. The upload images process 64 can also allow users to upload image files to the images database 66 from a compatible online source or another image storage system that is acceptable to the requirements of the user media storage system as described in webpage 2601 of FIG. 26. Referring back to FIG. 4, the process by which a user selects the option to access the upload other media process 68 may be understood. The option to access the upload other media process 68 is only available to users who are logged in with user level access, and users directly access to the upload other media process 68 through the edit user information system 54. During the upload other media process 68, a webpage interface prompts the user to select a media file, of a compatible format, from a local source to be uploaded to the invention's system. The local source can take the form of a personal computing device with Internet access and a compatible web browser or compatible upload application. Once the user selects the desired media file, the media file is transmitted from the user's local source to the upload other media process 68. The upload other media process 68 prompts the user to enter any desired information describing the uploaded media file in an online form, and gives the option for the user to finalize selection and submit the media file to the upload other media process 68 for storage. All uploaded media files are embedded with the security key code, described in the generate security key code process 46 of FIG. 3, of the uploading user; and the media file is then stored and indexed in the other media database 70 and made available for cross-referencing by other systems incorporated in the invention. The upload other media process 68 can also allow users to upload media files to the other media database 70 from a compatible online source or another media storage system that is acceptable to the requirements of the user media storage system as described in webpage 2601 of FIG. 26.

Referring to FIG. 5, the solicitation assistance and user matching system may be understood. As mentioned above, users may directly access the solicitation assistance and user matching system once user access 52 has been established. Users with specific needs for collaboration can input specific needs and/or requirements by submitting needs and requirements information using the edit user information system 54 and submit needs and requirements information for needs analysis by accessing the user's needs questionnaire system 56 through an online form and webpage interface. The user's needs questionnaire system 56 collects needs specific information about user needs, requirements, types of projects the user is interested in participating in, and other information that can be used by the solicitation assistance and user matching system to identify potentially compatible users.

Once information has been submitted to the user's needs questionnaire system 56, the user gains access to the criteria weighting system 58, using a webpage application which allows the user to prioritize specific user needs and specific user requirements using a weighting system. The webpage application of the weighting system allows users to adjust values which are associated with specific user needs and specific user requirements. The values of the weighting system affect calculations related to social compatibility, creative compatibility, workflow compatibility, skill level compatibility, financial compatibility, and other values such that when one value is raised in priority, the other values are diminished; thus requiring the user to isolate and evaluate requirements the user must have from requirements the user would like, but do not require, resembling a priority method as opposed to yes or no answers. The user interacts with the webpage application comprising the criteria weighting system 58 through a graphic user interface in the form of a series of sliding bars and/or a numerical entry associated with values related to the specific user needs and specific user requirements, such that as one value increases, the other values would decrease, such that the sum of the values would remain constant.

The information gathered in the user's needs questionnaire system 56 and criteria weighting system 58 is stored in the user's needs database 60. The user's needs database 60 indexes and cross references the above mentioned user needs information for use by the user's needs analysis system 62. Although it is possible for users browse the profiles and media of other users manually, the user's needs analysis system 62 automates much of the preliminary user sorting by comparing the needs and requirements of the accessing user against the needs and requirements of other users. The user's needs analysis system 62 compiles a list of potential matches for collaboration and displays the list to the accessing user in a webpage format. Users accessing the user's needs analysis system 62 have the option of organizing potential matches for collaboration which are then displayed as a series of lists or categories of lists, which is displayed to the accessing user in a webpage format. The user has the option to sort the lists of potential matches in a variety of formats including, but not limited to, alphabetically or according to the degree of potential collaboration determined by the user's needs analysis system 62. The webpage display output of the user's needs analysis system 62 allows the accessing user to browse potential matches by category such as browse authors 64, browse composers 66, browse musicians 68, and browse artists 70.

Users gain access to the user's needs analysis system 62 directly through the user solicitation assistance tool 72 by selecting a link or clicking a button accessible through a webpage interface associated with the user solicitation assistance tool 72. If a user does not want to utilize the user's needs analysis system 62 to provide a list of potential collaboration matches, the user can use the webpage interface of the user solicitation assistance tool 72 to directly browse authors 64, browse composers 66, browse musicians 68, and browse artists 70. Whether or not the accessing user utilizes the user's needs analysis system 62, the accessing user has the option to gain additional information about a potential collaboration partner by viewing that potential collaboration partner's abstract of selected media using the abstract of selected media system 74. The abstract of selected media system 74 provides brief information describing media samples of the potential collaboration partner-user who created the media samples being viewed by the accessing user. Accessing users have the option to gain further information about the potential collaboration partner and potential media by accessing the preview of selected media system 76. The preview of selected media system 76 provides sample media in an incomplete form although the incomplete form comprises sufficient media content to give any viewing user a fair and reasonable idea of the potential collaboration partner's capabilities, style, and quality of product. Once the accessing user is satisfied with the previewed material, or if the accessing user wishes to bypass the preview altogether, the accessing user makes a final collaboration partner selection by accessing the finalize selection system 78. The accessing user interacts with the finalize selection system 78 through a webpage interface which displays a summary of the potential collaboration partner's user information and requests confirmation of the accessing user's selection. The confirmation of the accessing user's selection takes the form of a dialogue box requiring the accessing user to select a yes link or button or a no link or button. The finalize selection system 78 can be accessed directly from the solicitation assistance tool 72, indirectly through the use of the user's needs analysis system 62, or through the preview of selected media system 76.

Referring to FIG. 6, the solicitation and collaboration agreement system may be understood. Once the accessing user has chosen a potential collaboration partner using the finalize selection system 78, an option to communicate with the chosen potential collaboration partner becomes available through the member email system 80. Alternatively, if the accessing user already knows the user identification information of the potential collaboration partner, the accessing user can use the member email system 80 to directly communicate with the potential collaboration partner, or any other user whose user identification information is known to the accessing user. User level access 52 is required before a user can gain access to member email system 80 which is the initial means of contact between users. In this way, all initial communication is logged, encrypted, and archived for future reference in the email database 82, which is hosted and managed by the email server 84. Archived emails can be accessed by either user involved in the email communication, or by the invention's administration should the need arise. Users may utilize member email directly once user level access has been gained 52 or indirectly through the user solicitation assistance tool 72 and then by finalizing a potential collaboration partner selection using the finalize selection system 78.

By accessing the member email system 80, users can contact other users and propose collaboration projects using the make an offer for project system 86. The make offer for project system 86 allows for flexible proposals, and since the make offer for project system 86 uses the member email system 80 to facilitate all communication, a record of collaboration proposals is recorded in the email database 82 for future reference by the users involved or the invention's administration. Collaboration proposals made through the make offer for project system 86 can be vague and involve several communications or can be initially very specific. The make offer for project system 86 allows for offers to be made to multiple users if the accessing user feels that participation of multiple users is required for the collaboration project. The make offer for project system 86 assists users with the collaboration proposal process by structuring the information comprising collaboration proposals in standardized organizational formats, thus allowing the receiving users to quickly view the proposal information in a familiar and consistent format. Once the details of the collaborative partnership have been addressed by the users involved in the proposed collaboration, all users involved in the proposed collaborative partnership must agree to the terms of the partnership contract. The contract agreement of the users involved in the proposed collaboration is managed by the agree to terms system 88. The agree to terms system 88 displays the terms of the collaboration partnership contract in the form of a webpage and individually confirms each participating user's agreement using a dialogue box requiring each participating user to select a yes link or button or a no link or button, thus indicating user agreement or disagreement, respectively, with the contract terms. A user indicating user agreement through the use of the agree to terms system 88 constitutes the user's digital signature of the contract displayed by the agree to terms system 88. The terms of a given collaboration partnership contract can be written by the individual participating users, or selected by the participating users from a list of predefined terms made available for user selection through a webpage interface. Common examples of predefined collaboration partnership contract terms are listed in a webpage format as part of the how to section of the website as diagramed in FIG. 10 through FIG. 17.

Once all users involved in the potential collaboration group come to an agreement concerning the terms of the collaboration contract and provide a digital signature through the use of the agree to terms system 88, the digitally signed terms of agreement is indexed and stored in the database of signed agreements 90. The digitally signed contracts stored in the database of signed agreements 90 can only be made accessible, in a read-only format, by the users associated with the agreement or by the invention's administration, should future reference be required, since once finalized by the agree to terms system 88, the terms of agreement would be unchangeable since it constitutes a signed contract, and is subject to enforcement under the terms of use 38 of FIG. 3 of the invention that every user agreed to follow as part of the user account creation and login system. Additionally, the database of signed agreements 90 is accessed later, during the creation of a final product, such that the terms of agreement between participating users is embedded into the final product of the above mentioned participating users, by the embedding into product system 91. The embedding into product system 91 embeds all contract and user information in an encrypted format for later reference should the need arise, as part of the protection granted to content creators by the systems comprising the invention, and by the invention's native augmented text-media file output.

If an agreement is not reached by all users using the agree to terms system 88, the participating users have the option to make suggestions for revision of the collaboration agreement terms using the revise terms system 92 which, in turn, involves additional communication through the member email system 80 and a revised offer for collaboration is submitted using the make offer for project system 86. Once again, all users must indicate acceptance of the newly proposed terms of collaboration contract by providing digital signatures utilizing the agree to terms system 88 before the agreement can be signed and stored in the database of signed agreements 90. In the case of a complete refusal by one or more users, refusing users can indicate a final refusal for collaboration using the final user withdrawal system 94. The final user withdrawal system 94 requires a refusing user to confirm permanent refusal of collaboration in the form of a webpage interface dialogue box requiring a refusing user to select a link or button indicating yes or no to final withdrawal from the project. Once a refusing user chooses to be removed using the final user withdrawal system 94, the final user withdrawal system 94 informs any users remaining in the collaboration group of the refusing user's removal using the member email system 80. The restart solicitation system 96 is used to find potential replacement collaboration members and has similar functions to the user solicitation assistance tool 72 with the exception that previous refusing users are excluded from the solicitation process. The cycle of user solicitation, facilitated by the restart solicitation system 96 repeats until users suitable for collaboration are found, offers are made, all users involved come to an agreement of terms, and all users involved provide a digital signature using the agree to terms system 88, which is required for the collaboration process to continue into a collaboration and project creation phase.

Referring to FIG. 7, the media collaboration and project creation system may be understood. Users may only gain access to the media collaboration tool 98 once there is a signed agreement by all participating users of a given collaboration group. When a new project collaboration group is formed, the media collaboration and project creation system begins by having the group id creation system 100 generate and assign a group id to the newly formed project collaboration group. Every group id generated by the group id creation system 100 is unique to the project collaboration group to which the group id is assigned, and the group id is comprised of information relating to the individual user members of the project collaboration group, as well as information which describes and identifies the project collaboration group. The group id also comprises identification information which distinguishes one project collaboration group from another project collaboration group. Once a group id has been generated and assigned to a project collaboration group, the group id creation system 100 indexes and records the group id, and a logs all transactions and activities relating to the generated and assigned group id in the group id database 102. Furthermore, the group id of a project collaboration group is embedded into all project material created and/or modified by the project collaboration group, while using the tools comprising the invention's project collaboration and content creation system 104, by the embedding into project system 91. The group id information is embedded into created and or modified project material using an encrypted format such that the group id functions as a digital signature and authentication key in order to prove ownership and assist with business and financial transactions involving the created and/modified material. In this way, the group id is accessed by the invention's systems later during the creation of a final augmented text-media product as a means of keeping track of user participation, or even group participation should multiple groups of users all work together, in the creation of an augmented text-media file. As previously stated, the embedding into product system 91 embeds the group id using an encrypted format, such that group id information is available for future reference should the need arise, as part of the protection granted to content creators by the systems comprising the invention and by the invention's native augmented text-media file output.

The project collaboration and content creation system 104 comprises various tools for creating and manipulating text, audio, image, video, and other forms of media. The user interaction with the project collaboration and content creation system 104 varies depending on the nature of the collaboration agreement, composition of the group, and the nature and format of the desired output augmented text-media product. In all cases, users work individually or in small groups to create media content components, utilizing user-owned local tools or online tools provided by the systems comprising in the invention. User created content is then added to the project using the project content upload system 106 which utilizes a media upload process similar to the upload music process 56, the upload stories process 60, the upload images process 64, and the upload other media process 68, which an individual user accesses to upload individual user media. The process used by the project content upload system 106 differs from the above mentioned individual user media upload processes in that the group-participating user's project collaboration group id information is embedded into any user created media intended for collaboration group use in addition to the uploading user's individual user id by the embedding into product system 91. As with all media upload systems comprising the invention, the project content upload system 106 requires that all uploaded media is consistent with the acceptable file format requirements detailed in FIG. 26. Once uploaded content will is digitally signed and logged by the embedding into product system 91 with the appropriate group and user id's and keys embedded in an encrypted format within the augmented text-media file format, the digital signatures are indexed, stored, and logged by the signed content database 108 where the digital signatures of uploaded group media can be referenced by the systems comprising the invention for group tracking and contract enforcement purposes.

Once all of the user and group content for a given project is compiled, logged, and embedded into the overall group project files, the content editing process 110 begins. Users and groups have the opportunity to utilize user-owned local tools or online tools provided by the systems incorporated in the invention to redo or modify collaboration group content for resubmission. All members of the collaboration group must agree to and authorize the final composition of a group project before the publish product system 112 is used to compile and publish the collaboration group project into a finalized augmented text-media file format. The authorization process of the publish product system 112 confirms publication authorization from every participating user in the collaboration group by requiring each participating user in the collaboration group to select a yes or no link or button in a webpage interface dialogue box. A user selecting yes or no in the dialogue box of the publish product system 112 constitutes a digital signature and contract under the invention's terms of use. If any user does not select yes in the dialogue box of the publish product system 112, the publish product system 112 logs in the signed content database, using the particular collaboration group's id, that there is not a consensus for publication. The publish product system 112 indicated a lack of required consensus using an email message and directs the participating users through a webpage interface to access the content review system 114. The content review system utilizes a sequence of webpage interface displays, online question and answer forms, and dialogue boxes to facilitate a constructive project and content review process in a structured format, including but not limited to requiring dissenting users to state any reasons which led to a no decision to finalize the publication of the collaboration group project. Users who wish to discuss and review the collaboration group project outside of a structured format are instructed by the content review system 114 to utilize member email and other forms of individual communication. Regardless of communication method used by the participating group members, the edit and review cycle comprising the content review system 114, the content editing process 110, and the publish product system 112 repeats until all users collaborating in the group come to an agreement and all participating users provide a digital signature to the publish product system 112. Once the publish product system 112 indicates to the final group product system 116 that all participating users are in agreement and that all requirements for publication have been met, the final group product system 116 publishes the finalized collaboration group project in the invention's native augmented text-media file format. The final published augmented text-media product file is catalogued and stored in the approved product listing database 118 which also contains a master copy of the final version of all project-embedded information gathered by the content embedding into product system 91. The final group product 116 is always first compiled in the invention's native augmented text-media file format which is proprietary to the invention although a file conversion process is possible as described later. The invention's native augmented text-media file format is compiled by the final group product system 116 in such a way that, the sum of the component media pieces comprising the whole augmented text-media project, both the overall augmented text-media file format package, and each of the augmented text-media file's comprising media component, have individually embedded, and group embedded, digital signatures for tracking purposes, as well as multi-layered encryption for security purposes. The above described file format and individual component/overall file package digital signature embedding process, functions as a multi-layered author identity protection against duplication by unauthorized parties, as well as information tracking means of contract enforcement between the users comprising the collaborative project group, as well as contract enforcement between the collaborative project group and the terms of use and agreements associated with the systems comprising the invention.

Users can convert the invention's native formatted augmented text-media files to other desired formats using the export to desired format tool 118 provided that all members of the project collaboration group that created the native augmented text-media file being converted provide a digital signature to the export to desired format tool 118 indicating agreement. The export to desired format tool 118 requests agreement through a webpage interface dialogue box where a user can select a yes or no link or button representing a user's digital signature, subject to the terms of use of the invention. The export to desired format tool 118 requires the agreement of every user who participated in the creation of a native augmented text-media file before export because exported formats do not necessarily contain the embedded digital signatures and multi-layered encryption that the invention's native output format contains. Because it is possible for the export tool 118 to generate an output file format which is not covered under the invention's terms of use, which every user agreed upon during the account creation process referenced in terms of use 38 of FIG. 3, the invention's administration can require a project review by the format approval system 120 which submits a format approval authorization request to administrative systems comprising the invention for final review by administration members associated with the invention, before final export access is granted. Without approval, final group products would only be granted final release in the augmented text-media file format native to the invention.

Referring to FIG. 8, the product gallery and sales system may be understood. Whether published in the invention's native format or in an exported non-native format, the final publication release of group augmented text-media projects are stored and indexed in the database of media for sale 122. The systems comprising the product gallery and sales system directly or indirectly access the database of media for sale 122 as part of any sales process involving the sale of augmented text-media files created using the systems comprising the invention. The database of media for sale 122 functions as the primary point of connection between the media collaboration and project creation system discussed above and diagramed in FIG. 7, and the product gallery and sales system described in FIG. 8.

A user interested in viewing and/or purchasing completed augmented text-media products, hosted and published by the systems comprising the invention, is only able to access to the product gallery and sales system once the user has logged into a user account and has gained user level access as described earlier in step 52 of FIG. 3. Referring to FIG. 8, it may be understood how a user with user level access gains access to the product gallery and sales system by selecting a link or button displayed on the invention's home page 10 which then connects the user to the main gallery 124. The main gallery 124 acts as a user's primary portal to the systems comprising the product gallery and sales system by means of a webpage interface. The main gallery 124 provides a user with the to access featured items 126 by means of a graphic display of links to featured items 126, said graphic display being located in a prominent and central location on the main gallery 124 webpage interface.

Referring to FIG. 27, an example of the main gallery 124 webpage interface and featured items 126 display may be understood in the form of webpage 2701. Webpage 2701 of FIG. 27 shows how users view the "cover" graphics of augmented text-media files, said cover graphics including links to a product page. Authoring information about the users involved in the creation of the product displayed by the cover graphics on webpage 2701 is also included with links provided to grant users to access to informational pages or home pages of the authoring users involved in creation of the displayed augmented text-media file. Webpage 2701 of FIG. 27 also shows an example of how users can browse through suggested titles using a webpage interface horizontal scrolling control system. Webpage 2701 of FIG. 27 also describes methods for artist endorsements and related video clips in an interface which is accessible on desktop and laptop computers as well as electronic tablets and smart phones.

Referring back to FIG. 8, it may be understood how a user gains access to the online product catalogue system 128 which provides a comprehensive list of the augmented text-media files published for sale by the invention's systems in a webpage interface; the webpage interface utilizing a variety of searchable listing functions including, but not limited to, alphabetical title listing, category type listing, and author listing; the searchable listing functions utilizing the information comprising the database of media for sale 122. An example of a catalogue format is described in webpage 2801 of FIG. 28, which describes an organization of augmented text-media files. Since the augmented text-media file format native to the invention can support many different types of comprising media content, the systems comprising the product catalogue system 128 and database of media for sale 122 make possible the organization of the user viewable display listing webpage interface, of the above mentioned native augmented text-media, by distinct categories describing the media content type which is dominant within a given native format augmented text-media file being displayed. Possible categories include music, movies, children's books, and graphic novels, as shown in webpage 2801 of FIG. 28. The product gallery and sales system can support the sale of other items other beyond just augmented text-media files, meaning that it is possible for the product catalogue system 128 to list other forms of merchandise for sale as well.

Referring back to FIG. 8, it may be understood how a user selects a product from the product catalogue system 128 and views a preview of the product. User previews of products are accomplished by the user accessing the chapter and soundtrack preview system 130 through a webpage interface link or button associated with each product listed in the product catalogue system 128 and connecting the product listing with the product listing's corresponding preview. Users have the option to also select an item from the catalogue and save it for future reference in a favorites list accessible to the user at a later time by the user selecting a save to favorites link or button on the product catalogue system 128 webpage interface. The favorites list of user selected items is stored and indexed by the user favorites database 132. Users have the option to directly access the shopping cart system 132 for direct purchase of items as well as the option for users to experience samples of the media comprising a selected augmented text-media file before a user purchase decision is made. The above mentioned media sample takes the form of previewing music 134, previewing text 136, or previewing other media 138 as determined by the authoring user or group at the time of final product creation.

Referring to FIG. 29, an example of the chapter and soundtrack preview webpage interface may be understood in the form of webpage 2901. The chapter and soundtrack preview page described in webpage 2901 of FIG. 29 shows a product page comprising graphics, textual information, and links to user-created informational web pages which are submitted by the users involved in the creation of the augmented text-media file being previewed. Webpage 2901 of FIG. 29 also describes the chapter and soundtrack preview page associated with the chapter and soundtrack preview system 130 of FIG. 8, including user-selectable options for author biography and chapter preview with associated integrated soundtrack. The chapter and soundtrack preview system 130 webpage interface described by webpage 2901 of FIG. 29 provides options for users to include website links to the authoring user's personal website, facebook page, twitter page, imdb page, or other user selected internet recourse describing the content and users involved in the creation of the augmented text-media file being previewed, as approved by the administration team of the invention's website. Webpage 2901 of FIG. 29 describes the possibility of music and videos being hosted by the invention's website or embedded into websites hosted by third party sites, having partnership agreements with the invention's administration, to provide hosting for legal, licensed content. An integrated feedback system is also described by webpage 2901 of FIG. 29 which allows previewing users to interact with a blog operated by the creating user or users, as well as other forms of contact options which can be associated with the product catalogue 128 webpage interface, in the form of webpage links, to provide previewing users with direct or indirect communication between creating users and viewing users.

Options for advertising for other services or products are available to be included in chapter and soundtrack preview 130 of FIG. 8 as shown in webpage 2901 of FIG. 29. Options for a music area which includes album cover art of the soundtrack associated with the augmented text-media file being previewed is also described in webpage 2901 of FIG. 29, as well as a link, or button, which a user may click on, or select, to add the product being previewed to the user's online shopping cart system 140 of FIG. 8 for purchase; the shopping cart system 140 being a web-application accessible by users through a webpage interface. Referring back to FIG. 8, it may be understood how a list of items selected for purchase may be indexed and stored in the shopping cart database 140 and the shopping cart 142.

Referring to FIG. 30, an optional interface for the media preview process comprising the preview music system 134 of FIG. 8, the preview text system 136 of FIG. 8, and the preview other media system 138 of FIG. 8, may be understood in the form of webpage 3001. In the chapter and soundtrack preview interface described by webpage 3001, users have the option to view items in authoring user based categories in list form; the authoring users listing being determined by the predominant type of media which a given authoring user primarily creates; said list comprising artists, authors, musicians, filmmakers, and other types of user. The predominant media type which an authoring user primarily creates is entered by users during the user's account creation process through the webpage interface provided by the account type designation system 44 of FIG. 3. Webpage 3001 of FIG. 30 also describes users having the option to organize preview lists in terms of specific content type such as graphic novels, comic books, musician storyteller, and other potential media categories which a user could preview. Webpage 3001 of FIG. 30 diagrams the process by which users webpage scrolling controls allowing users to browse through different categories as well as the process by which previewing users view additional information about the authoring users involved in the creation of the augmented text-media file being previewed, by means of selecting webpage links or buttons, including, but not limited to, an authoring user's personal website, facebook profile, twitter profile, or other informational websites relating to the augmented text-media product being previewed.

Referring back to FIG. 8, the process by which a user finalizes the purchasing of products may be understood. A user finalizes the selection of a product for purchase through the shopping cart system 142 using a webpage interface; the selection of a purchase being finalized when the user clicks on a purchase link or button associated with the product which the user desires to purchase. The financial information of the user selected items for purchase are processed for purchasing by the shopping cart system 142, which records any information relating to the purchase of a product in the shopping cart database 140. The purchasing user concludes the purchase of products by selecting a checkout link or button, through a website interface, which then transfers the purchasing information from the shopping cart database 140 to the checkout system 144. While interacting with the webpage interface associated with the shopping cart system 142 and checkout system 144, the purchasing user is presented with options to select various levels of access to the augmented text-media file which user is about to purchase; the webpage interface displaying to a purchasing user the option to purchase full access to an augmented text-media file during initial purchase, or the option to purchase a lesser degree of access. The invention's native augmented text-media file format, gives the option for access to the content comprising the augmented text-media file to be upgraded at a later time while the user is viewing the purchased augmented text-media file product. The option for future access upgrade by users, in real time, during product viewing, is possible because the entire augmented text-media file is downloaded in an encrypted format, such that the possibility exists for individual media components of the augmented text-media file to be unlocked separately In addition to the user and group information of the creating users already embedded in the augmented text-media file, the purchasing user's information and distribution information is also embedded into the purchased augmented text-media file. In this way, each purchased instance of a given augmented text-media file is unique to that particular instance. This final embedding process occurs after checkout system 144 completes all financial transactions with the purchasing user, but before the transaction is completed and the augmented text-media file is downloaded to the user's device by the transaction completed system 148; the information gathered by the checkout system being indexed and stored on the transaction database 146. Referring to FIG. 31, an example of a possible shopping cart interface in the form of webpage 3101 describing how users select the level of access they wish to purchase, may be understood.

Referring to FIG. 32, the method of generation and distribution of augmented text-media files may be understood. The augmented text-media file generation process begins with individual user creation of media content 150 and individual user creation of text content 152 upon which the individual user created media content and text content is then stored on the media content storage devise 154 and text content storage device 156 respectively. The individual user created text and individual user created media is digitally combined and formatted into the invention's native augmented text-media format by the combine media system 158, and the combined and formatted media is stored on the combined content storage device 160. An investment point selection 162 is made at the point in the story where the reader is assumed to be emotionally invested in the story and is deemed likely to consider an offer of value added content because of an increased understanding of the content and story thus far. Media bookmark point selection 164 indicators are inserted into the augmented text-media file corresponding with locations within the story where additional non-text media would add value and further augment the text of the story. These media bookmark points are then linked with the media content associated with each media bookmark point selection 164.

Creator identification information is embedded into the data comprising the augmented text-media file by the embed creator identification information system 166 and the encrypt media system 168 encrypts the augmented text-media file for security purposes and contract enforcement purposes between creator(s), end user, and operator of the inventive system. The final version of an augmented text-media product is indexed and stored in the final product content storage device 170 which is optionally the same system or a separate system as the combined content storage device 160. The final augmented text-media file product is then published and sold through the publish final product for sale system 172 which utilizes a website and online application technologies.

Users of the inventive system have the option of previewing a sales sample of the text, or a sales sample of the music, using a webpage interface by clicking a link or button associated with the corresponding sales sample text system 173 and the sales sample music system 174, before accessing the final product purchase selection system 175 by means of clicking a link or button on a webpage interface. Alternatively users have the option of bypassing the previewing of sample text and music by selecting a link or button on a webpage interface indicating the user's selection of a product for purchase, allowing the user to access the product purchase selection system 175 directly. Users are presented with options upon product selection through a webpage interface dialogue box in the form of a selectable menu of options or a series of clickable webpage buttons, allowing a user to indicate the user's decision to purchase a desired product with full media access, without media access, or with partial media access controlled by the select media access system 176. Products purchased with full media access provide the user with a product in an unlocked media format 177 such that all of the media content comprising the augmented text-media file is unlocked and user accessible. Products purchased without media access are provided to the user in a locked media format 178, such that all of the media comprising the augmented text-media file is locked however available for purchase, and consequently user granted access, at a later time. Products purchased with partial media access are provided to the user in a partial unlocked media format 180 such that some of the media comprising the augmented text-media file is unlocked while some of the media comprising the augmented text-media file is locked however available for future purchase, and consequently future user granted access.

Once the final purchase has been selected by the user, and purchase transaction completed, the purchasing user's purchase identification information is embedded into the data comprising the augmented text-media file by the embed purchase identification information system 182. The above mentioned embedding process performed by the embed purchase identification information system 182 outputs each purchased augmented text-media product in a, specific to purchasing user instance, making each augmented text-media file instance unique when compared to a previously identical augmented text-media product, thus assisting in the enforcement of legitimate user access and purchase/contract enforcement and protections. The user's purchased augmented text-media file product instance and purchase information is stored on the purchase order storage device 184, and the final product instance is made available for user download by the product available for download system 188.

Referring to FIG. 33, the user experience process may be understood. Users begin by downloading a purchased augmented text-media product instance to the user's local device 190 which takes the form of a personal computer, tablet, cell phone, or other internet capable device meeting the requirements for viewing augmented text-media files, upon which the purchased augmented text-media file instance is stored in the memory of the local product storage device 192 which can comprise part of the memory storage of the above mentioned personal computer, tablet, cell phone, or other user device meeting the requirements for the storage of augmented text-media file instances.

By launching an augmented text-media player application running on the user's local computing device, the user is able to view a user purchased product instance 194. User identity is verified by the verify user account information system 196 and user access permissions are checked by the valid permissions system 198 which determines user access to the product instance. If the user permissions do not match the permissions embedded in the data of the product instance, user access will be denied and the user will view an access denied message 200 on the screen of the viewing device. If the user permissions match with the permissions embedded in the data of the product instance, user access will be granted and the user will receive an access granted message 202 on the screen of the viewing device. User access to individual media content comprising the purchased augmented text-media file instance is determined by the verify content permissions system 204 to determine which media components the user has purchased. The verify content permissions system 204 transfers user access information to the unlock user authorized content system 206 which, in turn activates and grants the user access to the purchased media components of the purchased augmented text-media file instance.

Once content authorization access has been determined, the text of the purchased augmented text-media file instance becomes visible on the screen of the user's viewing device and user begins the reading process 208. When the user reaches one of the bookmark pages 210, previously selected by the author during the media bookmark point selection 164, a timer 212 begins, thus allowing the user time to read into the page before the user permissions for content system 214 checks the reading user's content access permissions for the media content associated with the current bookmark page 210. If the user had not previously purchased the media content access when the user originally purchased the product and was given options by the select media access system 176 of FIG. 32, the user is now offered a media sample 216 and presented with media content purchase offer 218, which allows the user to purchase the full media associated with the media sample 216.

If the offer is accepted by the user, the album or individual track(s) system 220 presents the user with an option, in the form of a dialogue box displayed on the user's viewing device, for the user to purchase the entire album or an individual track or tracks. Purchasing the entire album activates the unlock album system 222 to make available the entire media content comprising album whereas purchasing individual tracks activates the unlock track(s) system 224 only unlocks the tracks that the user purchases. The purchase information is transmitted online and stored on the invention's purchase order device 226, and the user's upgraded purchased product instance is embedded with the new purchase identification information by the embed purchase identification information system 228 which adds to the data incorporated in the purchased augmented text-media product instance.

Whether the media access is purchased at the time of original augmented text-media product instance purchase or purchased during reading, once the user has permission to view the purchased media content, the user is given the option to experience the media by the play content system 230. If the user selects to play the media by selecting a button in a dialogue box displayed on the user's viewing device, the content player 232 will activate and the media will begin playing. During play, the user is presented with the end content option 234 such that, when selected, the content player 232 is instructed to terminate playing media. The end content option 234 can be executed by the viewing user at any time. Additionally, the user can select an option instructing the content player 232 to replay the media until the end content option 234 is selected by the user. Terminate and replay options are accessed by touch activated icons on the screen of the viewing device, such as a smart phone, tablet or PC if the viewing device is capable of receiving user-touch input. Once the media has ended or the user selects to end the media, the user continues the reading process 236. The user also has the option to continue reading 236 if the user had not accepted the offer to purchase additional media 218 or if the user had chosen not to play the media 230.

Every time the user reaches a new bookmarked page 210, the system will begin a new cycle described in steps 210 through 236. The system will continue through new cycles until the specific bookmark page 210 is reached which indicates the end of the story 238, at which point the cycle will terminate.

What is claimed:

1. A method for enabling the storage, distribution, and use of associated text and media files, comprising:
   (a) inputting a textual content file comprising a story into a text database storage medium coupled to an operator system computing device;
   (b) inputting a non-textual content file into a non-text database storage medium coupled to said operator system computing device;
   (c) associating said textual content files with said non-textual content files forming a combined media format, said combined media format comprising segregated and encrypted text content file components and non-text content file components;
   (d) independently restricting access and/or independently granting access to said segregated and encrypted text content file components;
   (e) independently restricting access and/or independently granting access to said segregated and encrypted non-text content file components;
   (f) inputting a user investment marking point into said combined media format, said user investment marking point indicating a user experience point where a user is likely to have gained sufficient understanding and attachment to the story to have a high interest in additional non-textual media associated with said combined media format;
   (g) inputting event marking points into said combined media format;
   (h) associating creator information with said text content file and said non-text content file, receiving purchasing information, and associating said creator information, said text content file and said non-text content file with said purchasing information to generate a purchased product file;
   (i) inputting creator identification information into a creator identification information database storage medium coupled to an operator system computing device;
   (j) sending a purchaser purchase identification information;
   (k) inputting creator contract information into a creator contract information database storage medium coupled to an operator system computing device;
   (l) associating said creator contract information to said text and/or non-text content files comprising said combined media format;
   (m) inputting purchase identification information into a purchase identification information database storage medium coupled to an operator system computing device;
   (n) associating said purchase identification information to said combined media format and generating a user-downloadable user-specific combined media format instance;
   (o) receiving from the purchaser said purchase identification information and comparing said purchase identification information associated with said user-downloadable user-specific combined media format instance with said purchase identification information in said purchase identification information database; and
   (p) facilitating the communication of said user-downloadable user-specific combined media format instance to a local user computing device using an internet connection, at least one of the above steps being implemented by a computer processor.

2. A method as in claim 1 wherein real-time user access permissions may be modified and further comprising the granting and/or blocking of real-time user access to non-text media files in connection with storage, distribution, and use of text and non-text media files, along with the sale and distribution of modified said real-time user access permissions, and generating an augmented text-media file by:
  (a) individually encrypting non-text media files associated with text comprising an encrypted augmented media file format;
  (b) inputting said encrypted augmented media file format into an encrypted augmented media file format database storage medium coupled to an operator system computing device;
  (c) inputting sales information associated with the download of said encrypted augmented media file format into a sales information database storage medium coupled to an operator system computing device;
  (d) inputting user-specific media file access information into said sales information database storage medium coupled to an operator system computing device;
  (e) downloading a copy of said encrypted augmented media file along with corresponding user-specific media file access information into a local user storage medium coupled to a local user operator system computing device;
  (f) inputting modified sales information associated with the download of said encrypted augmented media file format into said sales information database storage medium coupled to an operator system computing device;
  (g) inputting modified user-specific media file access information into said sales information database storage medium coupled to an operator system computing device;
  (h) modifying user-specific media file access information corresponding to said encrypted augmented media file downloaded into the local user storage medium coupled to a local user operator system computing device, in real-time, during viewing of said encrypted augmented media file;
  (i) A user-downloaded file package containing text and individually locked non-text media file components comprising a locked encrypted augmented media file;
  (j) inputting unlock access information, associated with said individually locked non-text media file components, into an access information database storage medium coupled to an operator system computing device;
  (k) inputting sales information associated with the purchase of user access permissions of said locked encrypted augmented media file into a sales information database storage medium coupled to an operator system computing device;
  (l) downloading a copy of said locked encrypted augmented media file to the memory of a local user computing device;
  (m) downloading a copy of said sales information associated with the purchase of said user access permissions to the memory of said local user computing device;
  (n) coupling said purchased user access permissions associated with said individually locked non-text media file components to said individually locked non-text media file components in the memory of said local user computing device;
  (o) verifying said user access permissions in the memory of said local user computing device during playback of said individually locked non-text media file components;
  (p) unlocking specific said individually locked non-text media file components which said verifying has confirmed that said user access permissions have already been purchased;
  (q) displaying an offer, during viewing of said locked encrypted augmented media file, for real-time purchase of additional said user access permissions corresponding with said individually locked non-text media file components which said verifying has confirmed that said user access permissions have not already been purchased;
  (r) re-verifying, following the displaying of said offer for real-time purchase of additional said user access permissions, said user access permissions in the memory of said local user computing device during playback of said individually locked non-text media file components; and
  (s) unlocking specific said individually locked non-text media file components which said re-verifying has confirmed that said user access permissions have already been purchased.

3. A method as in claim 2 further comprising associating creator information with said locked encrypted augmented media file, receiving purchaser information, and combining said creator information and said locked encrypted augmented media file with said purchasing information to generate a purchased product locked encrypted augmented media file.

4. A method as in claim 3, wherein said purchased product locked encrypted augmented media file is generated by:
  (t) inputting creator identification information into a creator identification information database storage medium coupled to an operator system computing device;
  (u) embedding said creator identification information into said purchased product locked encrypted augmented media file comprising an embedded locked augmented media file;
  (v) inputting creator contract information into a creator contract information database storage medium coupled to an operator system computing device;
  (w) embedding said creator contract information into creator's text and/or media files comprising said embedded locked augmented media file;
  (x) inputting purchase identification information into a purchase identification information database storage medium coupled to an operator system computing device; and
  (y) embedding said purchase identification information into said embedded locked augmented media file outputting a user-downloadable user-specific embedded locked augmented media file instance.

5. A method as in claim 4, wherein said user-specific embedded locked augmented media file instance is coupled to an online monitoring server, and further comprising:
  (z) comparing said purchase identification information embedded in said user-downloadable user-embedded locked augmented media file instance with said purchase identification information in said purchase identification information database; and
  (aa) facilitating the communication and comparing of said purchase identification information between a local user computing device and a remote database monitoring server using an internet connection.

6. A method as in claim 1, wherein said purchaser purchase identification information is resident on said local user computing device and said user-specific combined media format instance is only played after verification over the internet of said purchaser purchase identification information resident on said local user computing device against said purchase identification information in said purchase identification information database.

7. A method as in claim 1, wherein said non-textual content file comprises an audio component.

8. A method as in claim 1, wherein said combined media format comprises individually encrypted text and non text content file components.

9. A method as in claim 1, wherein if said purchase identification information does not match said purchase identification information associated with said user-downloadable user-specific combined media format instance, user access is denied and the user is presented with offer information.

10. A method as in claim 1, wherein when a user investment marking point or an event marking point is reached by a user, said user is offered the contents of said non-textual content file.

11. A method as in claim 10, wherein said offered contents of said non-textual content file is a musical composition and said user is presented with a sample of said musical composition.

* * * * *